US012804393B2

(12) United States Patent
Chai

(10) Patent No.: US 12,804,393 B2
(45) Date of Patent: Nov. 17, 2026

(54) INFORMATION PROCESSING METHOD AND EQUIPMENT FOR ACCESSING A NON-PUBLIC NETWORK

(71) Applicants: China Mobile Communication Co., Ltd Research Institute, Beijing (CN); China Mobile Communications Group Co., Ltd., Beijing (CN)

(72) Inventor: Li Chai, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 487 days.

(21) Appl. No.: 18/260,985

(22) PCT Filed: Jan. 11, 2022

(86) PCT No.: PCT/CN2022/071446
§ 371 (c)(1),
(2) Date: Jul. 11, 2023

(87) PCT Pub. No.: WO2022/148483
PCT Pub. Date: Jul. 14, 2022

(65) Prior Publication Data

US 2024/0323769 A1 Sep. 26, 2024

(30) Foreign Application Priority Data

Jan. 11, 2021 (CN) ......................... 202110029343.0

(51) Int. Cl.
*H04W 12/06* (2021.01)
*H04W 36/00* (2009.01)
*H04W 36/14* (2009.01)

(52) U.S. Cl.
CPC ....... *H04W 12/06* (2013.01); *H04W 36/0033* (2013.01); *H04W 36/14* (2013.01)

(58) Field of Classification Search
CPC ... H04W 48/18; H04W 48/16; H04W 84/042; H04W 48/02; H04W 12/06;
(Continued)

(56) References Cited

U.S. PATENT DOCUMENTS

2020/0145835 A1 5/2020 Xu et al.
2020/0329422 A1 10/2020 Sirotkin et al.
(Continued)

FOREIGN PATENT DOCUMENTS

CN 111182543 A 5/2020
EP 3968676 A1 3/2022
(Continued)

OTHER PUBLICATIONS

Ericsson, Discussion to CAG selection, 3GPP TSG CT WG1 Meeting #116, C1-192025, Apr. 8-12, 2019, Xi'an (P. R. of China).
(Continued)

*Primary Examiner* — Allahyar Kasraian
(74) *Attorney, Agent, or Firm* — Price Heneveld LLP

(57) ABSTRACT

An information processing method, an equipment, a device and a readable storage medium are provided, which relate to the technical field of communication. The method includes: receiving first information sent by a first network node, where the first information is related to a NPN; obtaining information of a third network according to first configuration information and the first information, and initiating an onboarding procedure with the third network.

13 Claims, 8 Drawing Sheets

(58) Field of Classification Search
CPC ......... H04W 36/0033; H04W 36/1446; H04W 12/40; H04W 36/14; H04W 36/1443
See application file for complete search history.

(56) References Cited

U.S. PATENT DOCUMENTS

| | | | | |
|---|---|---|---|---|
| 2020/0396792 | A1 | 12/2020 | Tiwari et al. | |
| 2021/0058784 | A1* | 2/2021 | Kedalagudde | H04W 76/12 |
| 2021/0385739 | A1* | 12/2021 | Wang | H04W 48/18 |
| 2022/0060883 | A1* | 2/2022 | Zhu | H04W 8/245 |
| 2022/0201593 | A1 | 6/2022 | Baek et al. | |
| 2022/0256449 | A1* | 8/2022 | Chen | H04W 12/06 |
| 2022/0353680 | A1* | 11/2022 | Hu | H04L 63/0892 |
| 2022/0353798 | A1* | 11/2022 | Yang | H04W 48/16 |
| 2023/0084683 | A1* | 3/2023 | Chun | H04W 4/90 455/434 |
| 2023/0164194 | A1* | 5/2023 | Foti | H04W 8/205 370/329 |
| 2023/0189187 | A1* | 6/2023 | Velev | H04W 48/16 455/435.1 |
| 2023/0189192 | A1* | 6/2023 | Talebi Fard | H04W 12/088 726/4 |
| 2023/0199632 | A1* | 6/2023 | Talebi Fard | H04W 48/10 455/434 |
| 2023/0397147 | A1* | 12/2023 | Kawasaki | H04W 60/04 |

FOREIGN PATENT DOCUMENTS

| | | | |
|---|---|---|---|
| EP | 4080982 | A1 | 10/2022 |
| EP | 4084533 | A1 | 11/2022 |
| WO | 2020149240 | A1 | 7/2020 |
| WO | 2020204475 | A1 | 10/2020 |
| WO | 2020224622 | A1 | 11/2020 |
| WO | 2020250664 | A1 | 12/2020 |

OTHER PUBLICATIONS

Huawei, Hisilicon, Ericsson, Intel, Oppo, Samsung, Key Issue: UE Onboarding and Provisioning for non-public networks, SA WG2 Meeting #135, S2-1911761, Oct. 14-18, 2019, Split, Croatia.
Huawei, Hisilicon, KI #4, New Sol: UE onboarding and provisioning for SNPN subscription, 3GPP TSG-WG SA2 Meeting #139E e-meeting, S2-2003995, Jun. 1-12, 2020, Elbonia.
China Mobile, "Discussion paper on the solutions for the UE without the "CAG Information list" to access CAG cells of the HPLMN in the automatic selection mode", 3GPP TSG CT WG1 Meeting #126-e, C1-206129, Electronic Meeting, Oct. 15-26, 2020.
Orange, Telecom Italia, China Mobile, Deutsche Telekom, AT&T, "KI#4, Sol#39: Update to resolve Editor's Notes", 3GPP TSG-WG SA2 Meeting #140E e-meeting, S2-2005863, Elbonia, Aug. 19-Sep. 1, 2020.
Samsung, "KI#4, Sol#5, Update to address the EN", SA WG2 Meeting #S2-142E, S2-2008812, Electronic, Elbonia, Nov. 16-20, 2020.
"3rd Generation Partnership Project; Technical Specification Group Services and System Aspects; Study on enhanced support of non-public networks (Release 17)", Marked-up Copy, 3GPP TR 23.700-07 V1.21.0 (2020-110), Valbonne, France.
"3rd Generation Partnership Project; Technical Specification Group Services and System Aspects; Study on enhanced support of non-public networks (Release 17)", Clean Copy, 3GPP TR 23.700-07 V1.2.0 (Nov. 2020), Valbonne, France.
First Singaporean Office Action for Singaporean Patent Application No. 11202305301W mailed Jan. 8, 2026, 10 pages.
First Indian Office Action for Indian Patent Application No. 202327054098 mailed Mar. 6, 2026, 9 pages.

* cited by examiner

INFORMATION PROCESSING METHOD AND EQUIPMENT FOR ACCESSING A NON-PUBLIC NETWORK

CROSS REFERENCE OF RELATED APPLICATION

The present disclosure is the U.S. national phase of PCT Application PCT/CN2022/071446 filed on Jan. 11, 2022, which claims a priority of Chinese patent disclosure No. 202110029343.0 filed on Jan. 11, 2021, which is incorporated herein by reference in its entirety.

TECHNICAL FIELD

The present disclosure relates to the technical field of communication, and in particular to an information processing method, an equipment, a device and a readable storage medium.

BACKGROUND

The 5G system introduces a non-public network (NPN, Non-Public Network). NPN is a network that is different from the public network and provides services for specific users, including the following two types:

1) Standalone NPN, which does not depend on the PLMN (Public Land Mobile Network, public land mobile network) network and is operated by the SNPN operator.

A SNPN network can be determined by a PLMN ID and a NID (Network Identifier, network identification). For example, a PLMN ID+NID can be used as an identification of an SNPN network. Users who subscribe to a certain SNPN service will configure the corresponding SUPI (Subscription Permanent Identifier, user permanent identification) and subscription information, which will be stored on the terminal and core network side.

A user who subscribes the SNPN service needs to support the SNPN access mode (access point). Users configured to support SNPN access mode can only access the network through SNPN, and users not configured to support SNPN access mode can perform the PLMN selection process. Among them, the configuration mode (activation, deactivation, etc.) of the SNPN access mode is implemented by the terminal.

Since the SNPN does not depend on the network function of the PLMN, it does not support switching between the SNPN and the PLMN network.

2) Public network integrated non-public network (Public network integrated NPN, PNI-NPN), which depends on the PLMN network and is operated by traditional operators.

The non-public network integrated with the public network provides NPN services through the PLMN network, for example, by assigning one or more network slicing entities to the NPN to implement non-public network functions. Under this type of network, UE (User Equipment, user equipment) has subscription to the PLMN network.

Since network slicing cannot restrict the terminal from trying to access the network in its unauthorized network slicing area, a cell access group (Cell Access Group, CAG) can be selected for access control. A CAG represents a group of subscribers who can access one or more CAG cells.

In the related aft, the authority of the UE is fixed in a SIM (Subscriber Identity Module, Subscriber Identity Module) card. When it is necessary to update the authority of the UE, it may cause interruption of the current connection of the UE.

SUMMARY

The present disclosure provide an information processing method, device, device, and readable storage medium to ensure service continuity.

In a first aspect, an information processing method is provided in an embodiment of the present disclosure, performed by a user equipment (UE), including:

receiving first information sent by a first network node, where the first information is related to a non-public network (NPN);

obtaining information of a third network according to first configuration information and the first information, and initiating an onboarding procedure with the third network;

where in the onboarding procedure, the UE acquires access information from the third network, where the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Optionally, the obtaining the information of the third network according to the first configuration information and the first information includes:

obtain the information of the third network from a core network according to the first configuration information and the first information.

Optionally, the information of the third network further includes at least one of:

O-SNPN information, slice information, data network information, subscription information of at least one local service provider of the UE, a label and/or an identification of at least one local service provider of the UE, information of at least one public land mobile network (PLMN) whose priority meets a first preset requirement, and information of at least one SNPN whose priority meets a second preset requirement.

Optionally, the first configuration information is pre-configured for the UE, and includes at least one of:

information of a service provider configured to provide access information;

SNPN information;

O-SNPN information;

SO-SNPN information;

slice information supported by SNPN;

data network information;

subscription information of at least one local service provider;

a label and/or an identification of at least one local service provider;

information of at least one equivalent local service provider;

a service provider control network selector;

a user-controlled network selector;

at least one PLMN whose priority meets a third preset requirement;

at least one SNPN whose priority meets a fourth preset requirement.

Optionally, the first information further includes at least one of:

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

Optionally, the method further includes:

sending a registration request message to the third network, where the registration request message includes at least one of:

information configured to indicate that the registration is not related to a UE subscription;

a UE's default credential and corresponding identity;

a label/identification, address information and/or identity of a service provider group from which the access information is obtained;

a label/identification, address information and/or identity of a service provider from which the access information is obtained;

a label/identification, address information and/or identity of an O-SNPN from which the access information is obtained;

a label/identification, address information and/or identity of an SO-SNPN from which the access information is obtained;

a first indication configured to provide a radio access network with information for selecting an access and mobility management function (AMF) of a core network and/or indicate that the registration is only limited to an onboarding service.

Optionally, prior to the receiving the first information sent by the first network node, the method further includes at least one of:

sending a random access code and an identification and/or a label of the non-public network;

sending an MSG3 and an identification and/or a label of the non-public network;

sending an MSGA and an identification and/or a label of the non-public network;

sending an identification and/or a label of the non-public network.

Optionally, the method further includes:

updating permission information of the non-public network of the UE according to the access information;

where the permission information of the non-public network includes at least one of:

a CAG list supported by the UE, an SNPN list supported by the UE, a CAG list and an SNPN list preferred by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC), UE only accessing through non-public network, UE accessing through public network.

Optionally, the method further includes:

when the UE finds that the UE does not have the subscription information of the non-public network according to the received first information, and the non-public network does not support a capability of accessing through access information of a third party, not initiate an access to a cell of the public network;

or when the UE finds that the UE does not have the subscription information of the non-public network according to the received first information, and a cell of the non-public network is a cell of a target version, not initiate an access to a cell of the non-public network.

Optionally, the first information further includes information configured to indicate that a state of a cell of the non-public network is "prohibited" or a state of a PLMN granularity is "prohibited" or a state of a non-public network identification granularity is "prohibited";

the method further includes:

acquiring, according to the first information, information whether a cell of the non-public network supports being accessed by the UE using the access information obtained from the third network;

when the non-public network supports being accessed by the UE using the access information obtained from the third network, ignore the information in the first information indicating that the state of the cell of the non-public network is "prohibited" or the state of the PLMN granularity is "prohibited" or the state of non-public network identification granularity is "prohibited";

when the non-public network does not support being accessed by the UE using the access information obtained from the third network, not accessing to the cell of the non-public network, according to the information in the first information indicating that the state of the cell of the non-public network is "prohibited" or the state of the PLMN granularity is "prohibited" or the state of the non-public network identification granularity is "prohibited".

Optionally, the method further includes:

sending, to the first network node, a capability of the UE including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Optionally, the method further includes:

sending the access information to the first network node.

In a second aspect, an information processing method is provided in an embodiment of the present disclosure, performed by a user equipment (UE), including:

updating permission information of a non-public network (NPN) of the UE, according to updated permission information of the NPN of the UE received from a network node;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updating the permission information of the NPN of the UE further includes:

an authorized CAG list of the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC).

Optionally, the updated permission information of the NPN of the UE is obtained through one of:

receiving the updated permission information of the NPN of the UE sent by the network node by using a protocol data unit (PDU) session;

receiving a radio resource control (RRC) signaling sent by the network node, where a radio bearer RB type is added to the RRC signaling, and the added RB type carries the updated permission information of the NPN of the UE.

Optionally, the method further includes:

reselecting a valid cell to camp on or connect to.

Optionally, the reselecting the valid cell to camp on or connect to includes:

when the UE is in an idle state, querying CAG information of the cell where the UE is currently camping on according to the updated permission information of the NPN of the UE, to determine whether the UE is capable of continuing to camp on the cell where the UE is currently camping on; when the UE is not capable of continuing to camp on currently camped cell, triggering a cell selection or reselection;

when the UE is in an inactive state, querying the information of the non-public network of the cell where the UE is currently camping on according to the updated permission information of the non-public network of the UE, and determining whether the UE is capable of continuing to camp on the cell where the UE is currently camping; when UE is not capable of continuing to camp on the cell where the UE is currently camping on, triggering a cell selection or reselection;

when the UE is in a connected state, receiving a first message sent by the network node, performing a measurement according to the first message, and reporting information of a discovered target cell to the network node;

where the first message includes any of the following messages:

RRC connection release information, a redirection message, a handover command, a handover start instruction.

Optionally, when the UE is in an inactive state and the reselected cell is not in a RAN area of a radio access network, sending a RAN area update signaling.

Optionally, the updated permission information of the NPN of the UE further includes: timer information; where each CAG ID corresponds to a timer, or, all CAG IDs correspond to a timer;

the method further includes:

determining whether the corresponding CAG ID is valid according to the timer information.

Optionally, the method further includes:

receiving time information sent by the network node;

within a time range determined by the time information, performing a communication in the cell currently camped on.

In a third aspect, an information processing method is provided in an embodiment of the present disclosure, performed by a first network node, including:

sending first information to a user equipment (UE), where the first information is related to a non-public network (NPN), and configured to enable the UE to determine information of a third network according to first configuration information and the first information and initiate an onboarding procedure;

where in the onboarding procedure, the UE acquires access information from a third network;

the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Optionally, the first information further includes at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

Optionally, the method further includes:

receiving the access information sent by the UE.

Optionally, the method further includes:

receiving a capability of the UE sent by the UE, where the capability includes at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Optionally, the first information further includes information configured to indicate that a state of a cell of the non-public network is "prohibited" or a state of a PLMN granularity is "prohibited" or a state of a non-public network identification granularity is "prohibited".

In a fourth aspect, an information processing method is provided in an embodiment of the present disclosure, performed by a network node, including:

sending updated permission information of a non-public network (NPN) of the UE to the UE, to enable the UE to update the permission information of the non-public network of the UE;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updating the permission information of the NPN of the UE includes at least one of:

a CAG list supported by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC).

Optionally, the updated permission information of the NPN of the UE is sent to the UE in any of the following ways:

sending the updated permission information of the NPN of the UE through a PDU session;

sending a RRC signaling, where a radio bearer RB type is added to the RRC signaling, and the added RB type carries the updated permission information of the NPN of the UE.

Optionally, the method further includes:

sending non-public network information related to the UE to a core network or an adjacent base station, includes at least one of:

non-public network information and corresponding third network information;

slice information corresponding to the non-public network supported in the updated permission information of the non-public network of the UE;

tracking area information corresponding to the non-public network supported in the updated permission information of the non-public network of the UE;

a permission information update of the non-public network of the UE indicated in a reason value of handover failure;

a permission information update of the non-public network of the UE indicated in a reason value of handover.

Optionally, the method further includes:

receiving the non-public network information related to the UE sent by the core network, including at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

Optionally, the method further includes:

processing according to the updated permission information of the NPN of the UE, including at least one of:

selecting an SNPN network that supports a connection to the third-party provider for the UE, according to the information of the third-party provider;

providing an SPNN network connected to a public network;

providing an SNPN network supporting IMS voice;

providing an SNPN network supporting NB-IoT;

providing an SNPN network supporting MTC;

authorized CAG list of the UE.

Optionally, the determining an RAN area according to the UE's authorized CAG list includes at least one of:

updating the RAN area according to the updated CAG ID;

when the CAG UE is updated to a non-CAG UE, selecting a public cell as the RAN area of the UE;

when a non-CAG UE is updated to a CAG UE, taking the CAG cell as the RAN area of the UE.

Optionally, the permission information for the non-public network further includes: timer information; where each CAG ID corresponds to a timer, or, all CAG IDs correspond to a timer;

the method further includes:

determining whether the corresponding CAG ID is valid according to the timer information.

Optionally, the method further includes:

receiving time information sent by the second network node, and sending the time information to the UE;

within a time range determined by the time information, communicating with the cell where the UE is currently camping on.

Optionally, the method further includes:

when the UE is in a connected state, during the process of the UE reselecting a valid cell to camp on or connect to, sending a first message to the UE;

where the first message includes any of the following messages:

RRC connection release information, a redirection message, a handover command, a handover start instruction.

Optionally, the permission information for the updated UE non-public network includes the updated permission information of the NPN of the UE of the cell;

the method further includes:

processing according to the updated permission information of the NPN of the UE includes at least one of:

updating a state of the CAG information of the cell, and send a paging message and a system message update message to the UE;

sending a dedicated signaling to the UE, where the dedicated signaling is configured to notify a change of the permission information of the cell.

Optionally, the method further includes:

sending at least one of messages to the UE:

RRC connection release information, a redirection message, a handover command, a handover start instruction.

Optionally, the handover command includes time information for the UE to communicate in the cell where the UE is currently camping on, within a time range determined by the time information.

Optionally, the method further includes: receiving at least one of the following information sent by the UE:

a random access code and an identification and/or a label of the non-public network;

an MSG3 and an identification and/or a label of the non-public network;

an MSGA and an identification and/or a label of the non-public network;

an identification and/or a label of the non-public network.

In a fifth aspect, an information processing equipment is provided in an embodiment of the present disclosure, applied to a UE, including:

a first receiving module, configured to receive first information sent by a first network node, where the first information is related to a non-public network (NPN);

a first processing module, configured to obtain information of a third network according to first configuration information and the first information, and initiating an onboarding procedure with the third network;

where in the onboarding procedure, the UE acquires access information from the third network, where the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Optionally, the first processing module is configured to obtain the information of the third network from a core network according to the first configuration information and the first information.

Optionally, the information of the third network further includes at least one of:

O-SNPN information, slice information, data network information, subscription information of at least one local service provider of the UE, a label and/or an identification of at least one local service provider of the UE, information of at least one public land mobile network (PLMN) whose priority meets a first preset requirement, and information of at least one SNPN whose priority meets a second preset requirement.

Optionally, the first configuration information is pre-configured for the UE, and includes at least one of:

information of a service provider configured to provide access information;

SNPN information;

O-SNPN information;

SO-SNPN information;

slice information supported by SNPN;

data network information;

subscription information of at least one local service provider;

a label and/or an identification of at least one local service provider;

information of at least one equivalent local service provider;

a service provider control network selector;

a user-controlled network selector;

at least one PLMN whose priority meets a third preset requirement;

at least one SNPN whose priority meets a fourth preset requirement.

Optionally, the first information further includes at least one of:

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

Optionally, the equipment further includes:

a second sending module, configured to send a registration request message to the third network, where the registration request message includes at least one of:

information configured to indicate that the registration is not related to a UE subscription;

a UE's default credential and corresponding identity;

a label/identification, address information and/or identity of a service provider group from which the access information is obtained;

a label/identification, address information and/or identity of a service provider from which the access information is obtained;

a label/identification, address information and/or identity of an O-SNPN from which the access information is obtained;

a label/identification, address information and/or identity of an SO-SNPN from which the access information is obtained;

a first indication configured to provide a radio access network with information for selecting an access and mobility management function (AMF) of a core network and/or indicate that the registration is only limited to an onboarding service.

Optionally, prior to the receiving the first information sent by the first network node, the equipment further includes a third sending module configured to perform at least one of:

sending a random access code and an identification and/or a label of the non-public network;

sending an MSG3 and an identification and/or a label of the non-public network;

sending an MSGA and an identification and/or a label of the non-public network;

sending an identification and/or a label of the non-public network.

Optionally, the equipment further includes:

a second processing module, configured to update permission information of the non-public network of the UE according to the access information;

where the permission information of the non-public network includes at least one of:

a CAG list supported by the UE, an SNPN list supported by the UE, a CAG list and an SNPN list preferred by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC), UE only accessing through non-public network, UE accessing through public network.

Optionally, the equipment further includes: a third processing module, configured to:

when the UE finds that the UE does not have the subscription information of the non-public network according to the received first information, and the non-public network does not support a capability of accessing through access information of a third party, not initiate an access to a cell of the public network;

or when the UE finds that the UE does not have the subscription information of the non-public network according to the received first information, and a cell of the non-public network is a cell of a target version, not initiate an access to a cell of the non-public network.

Optionally, the first information further includes information configured to indicate that a state of a cell of the non-public network is "prohibited" or a state of a PLMN granularity is "prohibited" or a state of a non-public network identification granularity is "prohibited";

the equipment further includes:

a first obtaining module, configured to acquire, according to the first information, information whether a cell of the non-public network supports being accessed by the UE using the access information obtained from the third network;

a fourth processing module, configured to, when the non-public network supports being accessed by the UE using the access information obtained from the third network, ignore the information in the first information indicating that the state of the cell of the non-public network is "prohibited" or the state of the PLMN granularity is "prohibited" or the state of non-public network identification granularity is "prohibited";

a fourth processing module, configured to, when the non-public network does not support being accessed by the UE using the access information obtained from the third network, not access to the cell of the non-public network, according to the information in the first information indicating that the state of the cell of the non-public network is "prohibited" or the state of the PLMN granularity is "prohibited" or the state of the non-public network identification granularity is "prohibited".

Optionally, the equipment further includes:

a fourth sending module, configured to send, to the first network node, a capability of the UE including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Optionally, the equipment further includes:

a fifth sending module, configured to send the access information to the first network node.

In a sixth aspect, an information processing equipment is provided in an embodiment of the present disclosure, applied to a UE, including:

a first update module, configured to update permission information of a non-public network (NPN) of the UE, according to updated permission information of the NPN of the UE received from a network node;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updating the permission information of the NPN of the UE further comprises:

an authorized CAG list of the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC).

Optionally, the updated permission information of the NPN of the UE is obtained by the first update module through one of:

receiving the updated permission information of the NPN of the UE sent by the network node by using a protocol data unit (PDU) session;

receiving a radio resource control (RRC) signaling sent by the network node, wherein a radio bearer RB type is added to the RRC signaling, and the added RB type carries the updated permission information of the NPN of the UE.

Optionally, the equipment further comprises:

a first processing module, configured to reselect a valid cell to camp on or connect to.

Optionally, the first processing module is further configured to:

when the UE is in an idle state, query CAG information of the cell where the UE is currently camping on according to the updated permission information of the NPN of the UE, to determine whether the UE is capable of continuing to camp on the cell where the UE is currently camping on; when the UE is not capable of continuing to camp on currently camped cell, triggering a cell selection or reselection;

when the UE is in an inactive state, query the information of the non-public network of the cell where the UE is currently camping on according to the updated permission information of the non-public network of the UE, and determining whether the UE is capable of continuing to camp on the cell where the UE is currently camping; when UE is not capable of continuing to camp on the cell where the UE is currently camping on, triggering a cell selection or reselection;

when the UE is in a connected state, receive a first message sent by the network node, performing a measurement according to the first message, and reporting information of a discovered target cell to the network node;

wherein the first message comprises any of the following messages:

RRC connection release information, a redirection message, a handover command, a handover start instruction.

Optionally, when the UE is in an inactive state and the reselected cell is not in a RAN area of a radio access network, sending a RAN area update signaling.

Optionally, the updated permission information of the NPN of the UE further comprises: timer information; wherein each CAG ID corresponds to a timer, or, all CAG IDs correspond to a timer;

the equipment further comprises:

a first determining module, configured to determine whether the corresponding CAG ID is valid according to the timer information.

Optionally, the equipment further comprises:

a first receiving module, configured to receive time information sent by the network node;

a second processing module, configured to, within a time range determined by the time information, perform a communication in the cell currently camped on.

In a seventh aspect, an information processing equipment is provided in an embodiment of the present disclosure, applied to a first network node, including:

a first sending module, configured to send first information to a user equipment (UE), where the first information is related to a non-public network (NPN), and configured to enable the UE to determine information of a third network according to first configuration information and the first information and initiate an onboarding procedure;

where in the onboarding procedure, the UE acquires access information from a third network;

the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Optionally, the first information further comprises at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

Optionally, the equipment further comprises:

a first receiving module, configured to receive the access information sent by the UE.

Optionally, the equipment further comprises:

a second receiving module, configured to receive a capability of the UE sent by the UE, wherein the capability comprises at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Optionally, the first information further comprises information configured to indicate that a state of a cell of the non-public network is "prohibited" or a state of a PLMN granularity is "prohibited" or a state of a non-public network identification granularity is "prohibited".

In an eighth aspect, an information processing equipment is provided in an embodiment of the present disclosure, applied to a network node, including:

a first sending module, configured to send updated permission information of a non-public network (NPN) of the UE to the UE, to enable the UE to update the permission information of the non-public network of the UE;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updating the permission information of the NPN of the UE comprises at least one of:

a CAG list supported by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC).

Optionally, the first sending module is configured to:

send the updated permission information of the NPN of the UE through a PDU session;

send a RRC signaling, wherein a radio bearer RB type is added to the RRC signaling, and the added RB type carries the updated permission information of the NPN of the UE.

Optionally, the equipment further comprises:

a second sending module, configured to send non-public network information related to the UE to a core network or an adjacent base station, comprises at least one of:

non-public network information and corresponding third network information;

slice information corresponding to the non-public network supported in the updated permission information of the non-public network of the UE;

tracking area information corresponding to the non-public network supported in the updated permission information of the non-public network of the UE;

a permission information update of the non-public network of the UE indicated in a reason value of handover failure;

a permission information update of the non-public network of the UE indicated in a reason value of handover.

Optionally, the equipment further comprises:

a first receiving module, configured to receive the non-public network information related to the UE sent by the core network, comprising at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

Optionally, the equipment further comprises:

a first processing module, configured to process according to the updated permission information of the NPN of the UE, comprising at least one of:

selecting an SNPN network that supports a connection to the third-party provider for the UE, according to the information of the third-party provider;

providing an SPNN network connected to a public network;

providing an SNPN network supporting IMS voice;

providing an SNPN network supporting NB-IoT;

providing an SNPN network supporting MTC;

determining a RAN area according to authorized CAG list of the UE.

Optionally, the first processing module is configured to perform at least one of:

updating the RAN area according to the updated CAG ID;

when the CAG UE is updated to a non-CAG UE, selecting a public cell as the RAN area of the UE;

when a non-CAG UE is updated to a CAG UE, taking the CAG cell as the RAN area of the UE.

Optionally, the permission information for the non-public network further comprises: timer information; wherein each CAG ID corresponds to a timer, or, all CAG IDs correspond to a timer;

the method further comprises:

a first determining module, configured to determine whether the corresponding CAG ID is valid according to the timer information.

Optionally, the equipment further comprises:

a second receiving module, configured to receive time information sent by the second network node, and sending the time information to the UE;

a second processing module, configured to within a time range determined by the time information, communicate with the cell where the UE is currently camping on.

Optionally, the equipment further comprises:

a second sending module, configured to, when the UE is in a connected state, during the process of the UE reselect a valid cell to camp on or connect to, sending a first message to the UE;

wherein the first message comprises any of the following messages:

RRC connection release information, a redirection message, a handover command, a handover start instruction.

Optionally, the permission information for the updated UE non-public network comprises the updated permission information of the NPN of the UE of the cell;

the equipment further comprises:

a third processing module, configured to process according to the updated permission information of the NPN of the UE, comprises at least one of:

updating a state of the CAG information of the cell, and send a paging message and a system message update message to the UE;

sending a dedicated signaling to the UE, wherein the dedicated signaling is configured to notify a change of the permission information of the cell.

Optionally, the equipment further comprises:

a third sending module, configured to send at least one of messages to the UE:

RRC connection release information, a redirection message, a handover command, a handover start instruction.

Optionally, the handover command comprises time information for the UE to communicate in the cell where the UE is currently camping on, within a time range determined by the time information.

Optionally, the equipment further comprises: a third receiving module, configured to receive at least one of the following information sent by the UE:

a random access code and an identification and/or a label of the non-public network;

an MSG3 and an identification and/or a label of the non-public network;

an MSGA and an identification and/or a label of the non-public network;

an identification and/or a label of the non-public network.

In a ninth aspect, an information processing equipment is provided in an embodiment of the present disclosure, applied to a UE, including: a processor and a transceiver;

the transceiver is configured to receive first information sent by a first network node, where the first information is related to a non-public network;

the processor is configured to obtain information of a third network according to first configuration information and the first information, and initiating an onboarding procedure with the third network;

where in the onboarding procedure, the UE acquires access information from the third network, where the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Optionally, the processor is configured to obtain the information of the third network from a core network according to the first configuration information and the first information.

Optionally, the information of the third network further includes at least one of:

O-SNPN information, slice information, data network information, subscription information of at least one local service provider of the UE, a label and/or an identification of at least one local service provider of the UE, information of at least one public land mobile network (PLMN) whose priority meets a first preset requirement, and information of at least one SNPN whose priority meets a second preset requirement.

Optionally, the first configuration information is pre-configured for the UE, and includes at least one of:

information of a service provider configured to provide access information;

SNPN information;

O-SNPN information;

SO-SNPN information;

slice information supported by SNPN;

data network information;

subscription information of at least one local service provider;

a label and/or an identification of at least one local service provider;

information of at least one equivalent local service provider;

a service provider control network selector;

a user-controlled network selector;

at least one PLMN whose priority meets a third preset requirement;

at least one SNPN whose priority meets a fourth preset requirement.

Optionally, the first information further includes at least one of:

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

Optionally, the transceiver is configured to send a registration request message to the third network, where the registration request message includes at least one of:

information configured to indicate that the registration is not related to a UE subscription;

a UE's default credential and corresponding identity;

a label/identification, address information and/or identity of a service provider group from which the access information is obtained;

a label/identification, address information and/or identity of a service provider from which the access information is obtained;

a label/identification, address information and/or identity of an O-SNPN from which the access information is obtained;

a label/identification, address information and/or identity of an SO-SNPN from which the access information is obtained;

a first indication configured to provide a radio access network with information for selecting an access and mobility management function (AMF) of a core network and/or indicate that the registration is only limited to an onboarding service.

Optionally, the transceiver is configured to perform at least one of:

sending a random access code and an identification and/or a label of the non-public network;

sending an MSG3 and an identification and/or a label of the non-public network;

sending an MSGA and an identification and/or a label of the non-public network;

sending an identification and/or a label of the non-public network.

Optionally, the processor is configured to update permission information of the non-public network of the UE according to the access information;

where the permission information of the non-public network includes at least one of:

a CAG list supported by the UE, an SNPN list supported by the UE, a CAG list and an SNPN list preferred by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC), UE only accessing through non-public network, UE accessing through public network.

Optionally, the processor is configured to:

when the UE finds that the UE does not have the subscription information of the non-public network according to the received first information, and the non-public network does not support a capability of accessing through access information of a third party, not initiate an access to a cell of the public network;

or when the UE finds that the UE does not have the subscription information of the non-public network according to the received first information, and a cell of the non-public network is a cell of a target version, not initiate an access to a cell of the non-public network.

Optionally, the first information further includes information configured to indicate that a state of a cell of the non-public network is "prohibited" or a state of a PLMN granularity is "prohibited" or a state of a non-public network identification granularity is "prohibited";

the processor is configured to:

acquire, according to the first information, information whether a cell of the non-public network supports being accessed by the UE using the access information obtained from the third network;

when the non-public network supports being accessed by the UE using the access information obtained from the third network, ignore the information in the first information indicating that the state of the cell of the non-public network is "prohibited" or the state of the PLMN granularity is "prohibited" or the state of non-public network identification granularity is "prohibited";

when the non-public network does not support being accessed by the UE using the access information obtained from the third network, not access to the cell of the non-public network, according to the information in the first information indicating that the state of the cell of the non-public network is "prohibited" or the state of the PLMN granularity is "prohibited" or the state of the non-public network identification granularity is "prohibited".

Optionally, the transceiver is configured to send, to the first network node, a capability of the UE including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Optionally, the transceiver is configured to send the access information to the first network node.

In a tenth aspect, an information processing equipment is provided in an embodiment of the present disclosure, applied to a UE, including: a processor and a transceiver;

the processor is configured to update permission information of a non-public network (NPN) of the UE, according to updated permission information of the NPN of the UE received from a network node;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updated permission information of the NPN of the UE further comprises:

an authorized CAG list of the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC).

Optionally, the updated permission information of the NPN of the UE is obtained by the processor through one of:

receiving the updated permission information of the NPN of the UE sent by the network node by using a protocol data unit (PDU) session;

receiving a radio resource control (RRC) signaling sent by the network node, wherein a radio bearer RB type is added to the RRC signaling, and the added RB type carries the updated permission information of the NPN of the UE.

Optionally, the processor is configured to reselect a valid cell to camp on or connect to.

Optionally, the processor is configured to when the UE is in an idle state, query CAG information of the cell where the UE is currently camping on according to the updated permission information of the NPN of the UE, to determine whether the UE is capable of continuing to camp on the cell where the UE is currently camping on; when the UE is not capable of continuing to camp on currently camped cell, triggering a cell selection or reselection;

when the UE is in an inactive state, query the information of the non-public network of the cell where the UE is currently camping on according to the updated permission information of the non-public network of the UE, and determining whether the UE is capable of continuing to camp on the cell where the UE is currently camping; when UE is not capable of continuing to camp on the cell where the UE is currently camping on, triggering a cell selection or reselection;

when the UE is in a connected state, receive a first message sent by the network node, performing a measurement according to the first message, and reporting information of a discovered target cell to the network node;

wherein the first message comprises any of the following messages:

RRC connection release information, a redirection message, a handover command, a handover start instruction.

Optionally, the processor is configured to, when the UE is in an inactive state and the reselected cell is not in a RAN area of a radio access network, send a RAN area update signaling.

Optionally, the updated permission information of the NPN of the UE further comprises: timer information; wherein each CAG ID corresponds to a timer, or, all CAG IDs correspond to a timer;

the processor is configured to determine whether the corresponding CAG ID is valid according to the timer information.

Optionally, the transceiver is configured to receive time information sent by the network node;

within a time range determined by the time information, perform a communication in the cell currently camped on.

In an eleventh aspect, an information processing equipment is provided in an embodiment of the present disclosure, applied to a first network node, including: a processor and a transceiver;

the transceiver is configured to send first information to a user equipment (UE), where the first information is related to a non-public network (NPN), and configured to enable the UE to determine information of a third network according to first configuration information and the first information and initiate an onboarding procedure;

where in the onboarding procedure, the UE acquires access information from a third network;

the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Optionally, the first information further comprises at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

Optionally, the transceiver is configured to receive the access information sent by the UE.

Optionally, the transceiver is configured to receive a capability of the UE sent by the UE, wherein the capability comprises at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Optionally, the first information further comprises information configured to indicate that a state of a cell of the non-public network is "prohibited" or a state of a PLMN granularity is "prohibited" or a state of a non-public network identification granularity is "prohibited".

In a twelfth aspect, an information processing equipment is provided in an embodiment of the present disclosure, applied to a network node, including: a processor and a transceiver;

the transceiver is configured to send updated permission information of a non-public network (NPN) of the UE to the UE, to enable the UE to update the permission information of the non-public network of the UE;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updated permission information of the NPN of the UE comprises at least one of:

a CAG list supported by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC).

Optionally, the transceiver is configured to send the updated permission information of the NPN of the UE through a PDU session;

send a RRC signaling, wherein a radio bearer RB type is added to the RRC signaling, and the added RB type carries the updated permission information of the NPN of the UE.

Optionally, the transceiver is configured to send non-public network information related to the UE to a core network or an adjacent base station, comprises at least one of:

non-public network information and corresponding third network information;

slice information corresponding to the non-public network supported in the updated permission information of the non-public network of the UE;

tracking area information corresponding to the non-public network supported in the updated permission information of the non-public network of the UE;

a permission information update of the non-public network of the UE indicated in a reason value of handover failure;

a permission information update of the non-public network of the UE indicated in a reason value of handover.

Optionally, the transceiver is configured to receive the non-public network information related to the UE sent by the core network, comprising at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

Optionally, the transceiver is configured to process according to the updated permission information of the NPN of the UE, comprising at least one of:

selecting an SNPN network that supports a connection to the third-party provider for the UE, according to the information of the third-party provider;

providing an SPNN network connected to a public network;

providing an SNPN network supporting IMS voice;

providing an SNPN network supporting NB-IoT;

providing an SNPN network supporting MTC;

determining a RAN area according to authorized CAG list of the UE.

Optionally, the transceiver is configured to perform at least one of:

updating the RAN area according to the updated CAG ID;

when the CAG UE is updated to a non-CAG UE, selecting a public cell as the RAN area of the UE;

when a non-CAG UE is updated to a CAG UE, taking the CAG cell as the RAN area of the UE.

Optionally, the permission information for the non-public network further comprises: timer information; wherein each CAG ID corresponds to a timer, or, all CAG IDs correspond to a timer;

the processor is configured to determine whether the corresponding CAG ID is valid according to the timer information.

Optionally, the transceiver is configured to receive time information sent by the second network node, and sending the time information to the UE;

a second processing module, configured to within a time range determined by the time information, communicate with the cell where the UE is currently camping on.

Optionally, the processor is configured to, when the UE is in a connected state, during the process of the UE reselect a valid cell to camp on or connect to, sending a first message to the UE;

wherein the first message comprises any of the following messages:

RRC connection release information, a redirection message, a handover command, a handover start instruction.

Optionally, the permission information for the updated UE non-public network comprises the updated permission information of the NPN of the UE of the cell;

the processor is configured to process according to the updated permission information of the NPN of the UE, comprises at least one of:

updating a state of the CAG information of the cell, and send a paging message and a system message update message to the UE;

sending a dedicated signaling to the UE, wherein the dedicated signaling is configured to notify a change of the permission information of the cell.

Optionally, the transceiver is configured to send at least one of messages to the UE:

RRC connection release information, a redirection message, a handover command, a handover start instruction.

Optionally, the handover command comprises time information for the UE to communicate in the cell where the UE is currently camping on, within a time range determined by the time information.

Optionally, the transceiver is configured to receive at least one of the following information sent by the UE:

a random access code and an identification and/or a label of the non-public network;

an MSG3 and an identification and/or a label of the non-public network;

an MSGA and an identification and/or a label of the non-public network;

an identification and/or a label of the non-public network.

In a thirteenth aspect, a communication device is provided in an embodiment of the present disclosure, including: a transceiver, a memory, a processor, and a program stored in the memory and executable by the processor;

the processor is configured to read the program in the memory to perform the information processing method according to any one of the above aspects.

In a fourteenth aspect, a readable storage medium for storing a program, where the program is performed by a processor to perform the information processing method according to any one of the above aspects.

According to the embodiment of the present disclosure, the UE may obtain the information of the third network according to the first information and the first configuration information sent by the first network node, and initiate an onboarding procedure with the third network. Therefore, according to the embodiments of the present disclosure, a service interruption of the UE may be avoided and a service continuity may be ensured.

DETAILED DESCRIPTION

The term "and/or" in the embodiments of the present disclosure describes the association relationship of associated objects, indicating that there may be three relationships, for example, A and/or B, which may mean: A exists alone, A and B exist simultaneously, and B exists alone these three situations. The character "/" generally indicates that the contextual objects are an "or" relationship.

The term "plurality" in the embodiments of the present application refers to two or more, and other quantifiers are similar.

Figure 1:
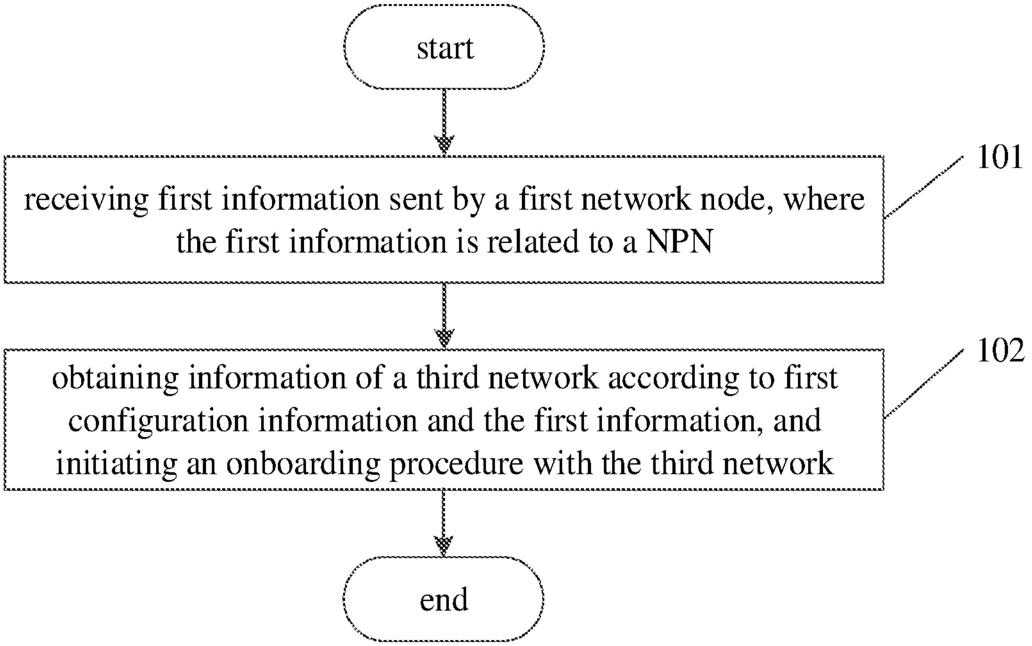
FIG. 1 is the first flowchart of the information processing method in an embodiment of the present disclosure.

The technical solutions in the embodiments of the present application will be clearly and completely described below in conjunction with the accompanying drawings in the embodiments of the present application. Obviously, the described embodiments are only some of the embodiments of the present application, not all of them. Based on the embodiments in this application, all other embodiments obtained by persons of ordinary skill in the art without making creative efforts belong to the scope of protection of this application.

a flowchart of an information processing method is provided by an embodiment of the present disclosure, which is applied to a UE, as shown in FIG. 1, and includes the following steps:

Step 101: receiving first information sent by a first network node, where the first information is related to a non-public network (NPN);

Step 102: obtaining information of a third network according to first configuration information and the first information, and initiating an onboarding procedure with the third network;

where in the onboarding procedure, the UE acquires access information from the third network, where the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Specifically, in this step, the UE may obtain the information of the third network from the core network according to the first configuration information and the first information.

In addition, the information of the third network further includes at least one of:

O-SNPN information, slice information, data network information, subscription information of at least one local service provider of the UE, a label and/or an identification of at least one local service provider of the UE, information of at least one public land mobile network (PLMN) whose priority meets a first preset requirement, and information of at least one SNPN whose priority meets a second preset requirement.

The first preset requirement and the second preset requirement can be set as required. For example, it may be that the priority is higher than a certain priority or the like.

where the first configuration information is pre-configured for the UE, and includes at least one of:

information of a service provider configured to provide access information;

SNPN information;

O-SNPN information;

SO-SNPN information;

slice information supported by SNPN;

data network information;

subscription information of at least one local service provider;

a label and/or an identification of at least one local service provider;

information of at least one equivalent local service provider;

a service provider control network selector;

a user-controlled network selector;

at least one PLMN whose priority meets a third preset requirement;

at least one SNPN whose priority meets a fourth preset requirement.

The third preset requirement and the fourth preset requirement can be set as required. For example, it may be that the priority is higher than a certain priority or the like.

In addition, the first information further includes at least one of:

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

In the embodiment of the present disclosure, the UE may obtain the information of the third network according to the first information and the first configuration information sent by the first network node, and initiate an onboarding procedure with the third network. Therefore, using the solutions of the embodiments of the present disclosure can avoid service interruption of the UE and ensure service continuity.

On the basis of the above embodiments, the UE may also send a registration request message to the third network, where the registration request message includes at least one of:

information configured to indicate that the registration is not related to a UE subscription;

a UE's default credential and corresponding identity;

a label/identification, address information and/or identity of a service provider group from which the access information is obtained;

a label/identification, address information and/or identity of a service provider from which the access information is obtained;

a label/identification, address information and/or identity of an O-SNPN from which the access information is obtained;

a label/identification, address information and/or identity of an SO-SNPN from which the access information is obtained;

a first indication configured to provide a radio access network with information for selecting an access and mobility management function (AMF) of a core network and/or indicate that the registration is only limited to an onboarding service.

On the basis of the foregoing embodiments, before step 101, the method further includes at least one of:

sending a random access code and an identification and/or a label of the non-public network;

sending an MSG3 and an identification and/or a label of the non-public network;

sending an MSGA and an identification and/or a label of the non-public network;

sending an identification and/or a label of the non-public network.

On the basis of the foregoing embodiments, the UE may also update the permission information of the non-public network of the UE according to the access information. where the permission information of the non-public network includes at least one of:

a CAG list supported by the UE, an SNPN list supported by the UE, a CAG list and an SNPN list preferred by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IoT), whether being a machine type communication (MTC), UE only accessing through non-public network, UE accessing through public network.

In order to ensure successful communication, if it finds that it does not have the subscription information of the non-public network according to the received first information, and the non-public network does not support the ability to use third-party access information to access, the UE does not initiate Access to the cell under the public network; or, if it is found that it does not have the subscription information of the non-public network according to the received first information, and at the same time, the cell of the non-public network is a cell of the target version, then The UE does not initiate access to cells under the non-public network. The target version may be a cell of any specified version, such as R15 or R16.

In addition, the first information further includes information indicating that the state of the cell of the non-public network is "prohibited" or the state of the PLMN granularity is "prohibited" or the state of the non-public network identification granularity is "prohibited". In this case, the method further includes:

The UE acquires, according to the first information, whether the cell of the non-public network supports access by the UE by using the access information acquired from the third network. when the non-public network supports being accessed by the UE using the access information obtained from the third network, ignore the information in the first information indicating that the state of the cell of the non-public network is "prohibited" or the state is "prohibited" or the state of the non-public network identification granularity is "prohibited"; if the non-public network does not support UE access by using the access information obtained from the third network, then according to the first information The information used to indicate that the state of the cell of the non-public network is "prohibited" or the state of the PLMN granularity is "prohibited" or the state of the non-public network identification granularity is "prohibited" is not applicable to the non-public network access to the community.

In practical applications, any identification may be used to indicate that the state of the non-public network cell is "prohibited" or the state of the PLMN granularity is "prohibited" or the state of the non-public network identification granularity is "prohibited". For example, the above information may be indicated by setting a certain flag bit in the first information as a preset identification.

On the basis of the above embodiments, the UE may also send the capabilities of the UE to the first network node, including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

In order to make the network understand the information of the UE, the UE may also send the access information to the first network node.

Figure 2:
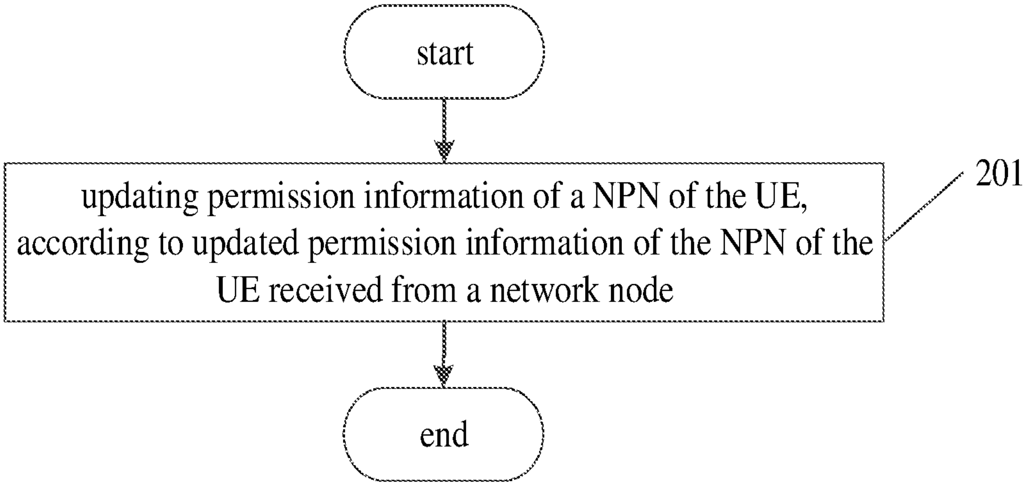
FIG. 2 is the second flowchart of the information processing method in an embodiment of the present disclosure.

Referring to FIG. 2, FIG. 2 is a flowchart of an information processing method provided by an embodiment of the present disclosure, which is applied to a UE, as shown in FIG. 2, and includes the following steps:

Step 201: updating permission information of a non-public network (NPN) of the UE, according to updated permission information of the NPN of the UE received from a network node.

Specifically, the NAS (non-access stratum) layer of the UE receives the updated permission information of the NPN of the UE, and sends the updated UE's non-public network permission information to The AS (access stratum) layer of the UE. The updated permission information of the NPN of the UE includes at least one of:

CAG list supported by UE (allowed CAG list), SNPN list supported by UE (allowed SNPN list), UE preferred cell access group CAG list and UE preferred SNPN list, UE only accessing through non-public network, UE can Access via public network.

Optionally, the updated permission information of the NPN of the UE further includes:

an authorized CAG list of the UE, whether the CAG ID or SNPN ID in the CAG list requires a third-party provider (such as power certification and other non-operator aspects) for authentication, UE authentication content, third-party provider information (such as name, whether it is a functional entity independent of the SNPN, the label of the entity, whether it provides management of authentication for UE access to the SNPN, etc.), whether supporting a communication with a public network at the same time, whether it supports IMS voice, whether it is NB-IoT, whether it is MTC.

the UE may obtain the permission information of updating the non-public network of the UE in any of the following ways:

(1) receive the updated permission information of the non-public network of the UE sent by the network node by using a PDU session, where the priority of the PDU session meets a fifth preset requirement.

where the fifth preset requirement can be set according to needs, for example, the priority is set to be higher than a certain threshold. Specifically, the network node establishes a special high-reliability high-priority PDU session (session) for UE authentication content, and is used to transmit non-public network permission information. Correspondingly, the UE obtains permission information of the non-public network through the special high-reliability high-priority PDU session.

(2) receive the RRC signaling sent by the network node, the RRC signaling is added with an RB type, and the added RB type carries the permission information of the updated UE's non-public network, where the added RB type is The security level of the secure encryption mode meets the sixth preset requirement.

where the sixth preset requirement can be set according to needs, for example, the security level is set to be higher than a certain threshold. The network node sets a new RB type in RRC, using the highest security encryption mode.

In the embodiment of the present disclosure, the UE can update the non-public network permission information of the UE according to the online updated permission information of the NPN of the UE sent by the network node, thereby avoiding interruption of UE services and ensuring service continuity.

On the basis of the foregoing embodiments, the UE may also reselect a valid cell to camp on or connect to. specific:

(1) when the UE is in an idle state, query the CAG information of the cell where the UE is currently camping on according to the updated permission information of the NPN of the UE, and determine whether it is possible to continue camping in the cell where the UE is currently camping on; if it cannot continue If camped on the cell currently camped on, cell selection or reselection is triggered.

Specifically, the UE re-compares information such as the CAG of the cell it is camping on to determine whether to continue to camp on the cell. If the CAG ID of the cell is not in the updated allowed CAG list, or does not comply with the SNPN network connected by a legal third-party service provider, or cannot provide an SNPN network connected to the public network, or cannot support IMS voice, or cannot Supporting conditions such as SNPN network of NB-IoT/MTC network, UE can restart selection/reselection of a new valid cell.

(2) when the UE is in an inactive state, query the non-public network information of the cell where the UE is currently camping on according to the updated permission information of the non-public network of the UE, and determine whether to continue to reside in the cell where it currently resides; if it is unable to continue to camp on the cell currently camped on, cell selection or reselection is triggered.

Specifically, the UE re-compares information such as the non-public network of the cell it is camping on to determine whether to continue to camp on the cell. If the cell is already illegal, the UE can restart the selection/reselection of a new valid cell. When the reselected cell is not in the RAN area, the RAN area update signaling is sent. That is, if the new cell is not located in a RAN (Radio Access Network) area, RAN area update signaling is triggered.

(3) when the UE is in a connected state, the UE receives the first message sent by the network node of the access network, performs measurement according to the first message, and reports the information of the discovered target cell to the network node; where the first message includes any of the following messages: RRC connection release information, redirection message, handover command, and handover start indication.

Optionally, in order to increase the accuracy of the updated permission information of the NPN of the UE, the updated permission information of the NPN of the UE further includes: timer information; where each CAG ID corresponds to a timing device, or, all CAG IDs correspond to a timer. That is to say, each CAG ID may correspond to a timer, or all CAG IDs may correspond to the same timer. The timer is maintained on the network node and the UE respectively.

When receiving the updated permission information of the non-public network of the UE sent by the network node, if the CAG list supported by the UE needs to be updated, the UE can determine whether the corresponding CAG ID is valid according to the timer information. If it is valid, the CAG list supported by the UE is updated; otherwise, the update operation may not be performed.

In addition, in order to enable the UE to perform uninterrupted handover and further ensure service continuity, the UE may also receive the time information sent by the network node, and within the time range determined by the time information, perform the communication.

Specifically, the network node carries a time information (to ensure the time when the data packet transmission is completed), including reference time information and/or a time period value, so that the UE can have sufficient time for uninterrupted handover. For example, if the service of the UE is URLLC (Ultra-reliable and Low Latency Communication, high-reliability and low-latency communication) and other services that require high reliability, the switching time of the UE can be postponed according to the time information, allowing the UE to continue to receive the service of the cell for a period of time allows the UE to have sufficient time to perform uninterrupted handover.

In addition, the UE may also send the updated permission information of the NPN of the UE to the network node. Correspondingly, according to the information of the third-party service provider in the information, the network node reselects the SNPN network that supports the connection of the third-party service provider for the UE; or provides the SNPN network connected to the public network; or provides support for IMS voice or support for NB-SNPN network of IoT/MTC network, where information such as whether the network node of the access network supports SNPN local authentication, whether it is SNPN or not can be broadcast through broadcast messages.

Figure 3:
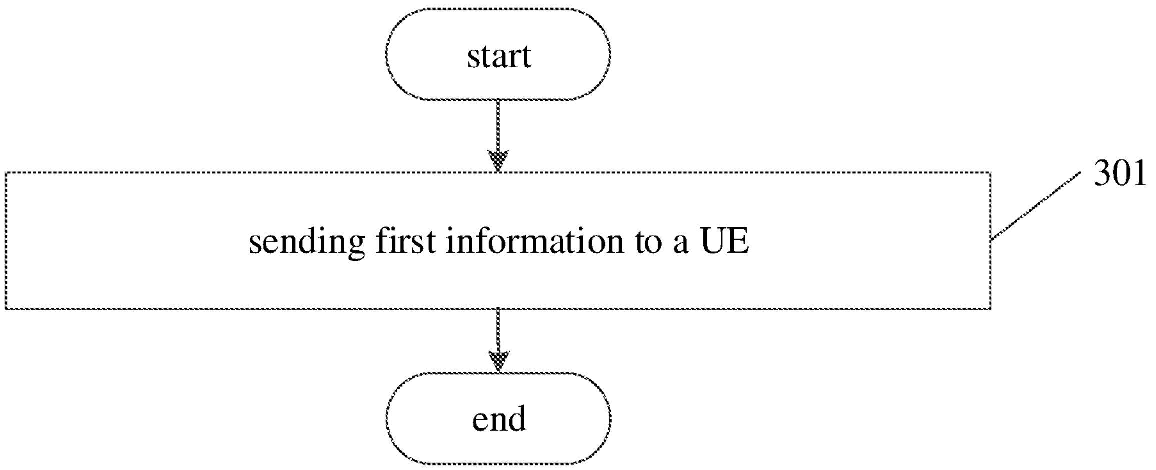
FIG. 3 is the third flowchart of the information processing method in an embodiment of the present disclosure.

Referring to FIG. 3, FIG. 3 is a flowchart of an information processing method provided by an embodiment of the present disclosure, which is applied to a first network node. In the embodiment of the present disclosure, the first network node is a wireless access network node, including at least one of: base station, CU (Centralized Unit, centralized unit), DU (Distributed Unit, distributed unit), relay, IAB (Integrated Access and Backhaul, integrated access and backhaul) node, BBU (Building Base band Unit, baseband processing unit), RRU (Radio Remote Unit, radio remote unit), as shown in FIG. 3, includes the following steps:

Step 301: sending first information to a user equipment (UE), where the first information is related to a non-public network (NPN), and configured to enable the UE to determine information of a third network according to first configuration information and the first information and initiate an onboarding procedure;

where in the onboarding procedure, the UE acquires access information from the third network;

the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

In addition, the first information further includes at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

In the embodiment of the present disclosure, the UE may obtain the information of the third network according to the first information and the first configuration information sent by the first network node, and initiate an onboarding procedure with the third network. Therefore, using the solutions of the embodiments of the present disclosure can avoid service interruption of the UE and ensure service continuity.

On the basis of the foregoing embodiments, the first network node may further receive the access information sent by the UE.

where the access information includes at least one of:

credential;

subscription information;

information used for authentication and/or authorization.

NPN network SNPN list supported by the UE, a cell access group CAG list favored by the UE, and an SNPN list favored by the UE, The UE can only access through a non-public network, and the UE can access through a public network.

Optionally, the authentication and/or authorization information further includes at least one of: UE's authorized CAG list, whether the CAG ID or SNPN ID in the CAG list needs to be authenticated by a third-party provider, UE's authentication content, the information of the third-party provider, whether supporting a communication with a public network at the same time, whether it supports IMS voice, whether it is NB-IoT, and whether it is MTC.

In addition, the first network node receives the capability of the UE sent by the UE, including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

Figure 4:
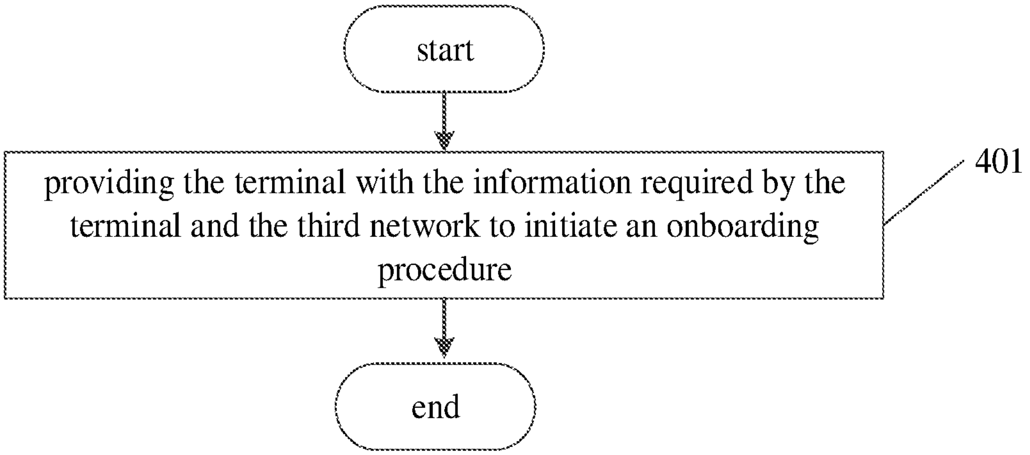
FIG. 4 is the fourth flowchart of the information processing method in an embodiment of the present disclosure.

Referring to FIG. 4, FIG. 4 is a flowchart of an information processing method provided by an embodiment of the present disclosure, which is applied to a second network node, as shown in FIG. 4, and includes the following steps:

Step 401, providing the terminal with the information required by the terminal and the third network to initiate an onboarding procedure.

where in the onboarding procedure, the UE acquires access information from the third network, where the access information includes at least one of:

credential;

subscription information;

information used for authentication and/or authorization;

the third network includes at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN.

Specifically, the information of the third network further includes at least one of:

O-SNPN information, slice information, data network information, subscription information of at least one local service provider of the UE, label and/or identification of at least one local service provider of the UE, and at least one priority conforming to the first Information about the PLMN that is required by a preset, and information of at least one SNPN whose priority meets the second preset requirement.

The first preset requirement and the second preset requirement can be set as required. For example, it may be that the priority is higher than a certain priority or the like.

On the basis of the above embodiments, the UE may also send the capabilities of the UE to the second network node, including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

In order to make the network understand the information of the UE, the UE may also send the access information to the second network node.

In the embodiment of the present disclosure, the UE can obtain the information of the third network, and initiate an onboarding procedure with the third network. Therefore, using the solutions of the embodiments of the present disclosure can avoid service interruption of the UE and ensure service continuity.

Figure 5:
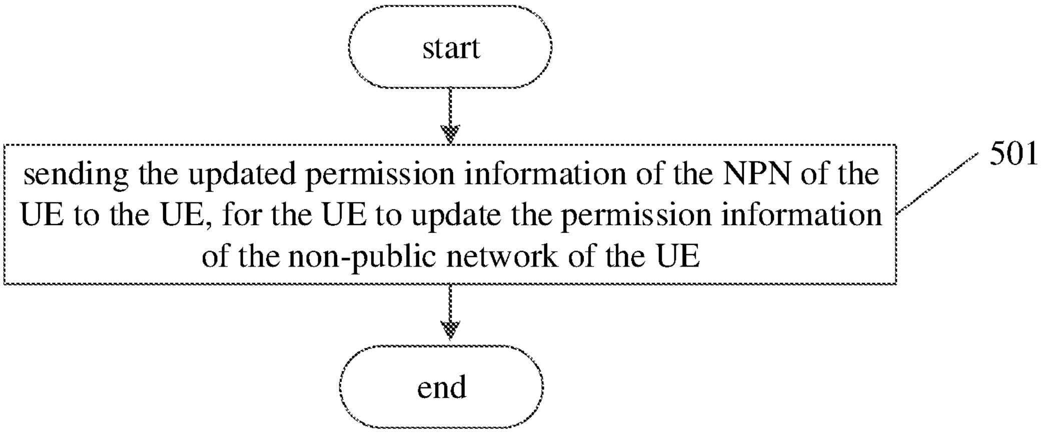
FIG. 5 is the fifth flowchart of the information processing method in an embodiment of the present disclosure.

Referring to FIG. 5, FIG. 5 is a flowchart of an information processing method provided by an embodiment of the present disclosure, which is applied to a second network node, as shown in FIG. 5, and includes the following steps:

Step 501, sending the updated permission information of the NPN of the UE to the UE, for the UE to update the permission information of the non-public network of the UE;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updating the permission information of the NPN of the UE includes at least one of:

supported by the UE, whether the CAG ID or SNPN ID in the CAG list needs to be authenticated by a third-party provider, the authentication content of the UE, the information of the third-party provider, whether supporting a communication with a public network at the same time, and whether it supports IMS voice, whether it is NB-IoT, whether it is MTC.

Specifically, the second network node may send the updated permission information of the NPN of the UE to the UE in any of the following ways:

sending the updated permission information of the NPN of the UE through a PDU session;

sending a RRC signaling, the RRC signaling adds an RB type, and the added RB type carries non-public network information related to the UE to the first network node, including at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

The second network node may send non-public network information related to the UE to the first network node through at least one of or messages:

Mobile restriction information; UE initial context establishment request message; handover request message; new non-public network mobile information field in downlink NAS transmission message; or delete NPN non-public network mobile information field; or SNPN in non-public network mobile information field ID or CAG ID updated.

On the basis of the above embodiments, the second network node may also perform processing according to the updated permission information of the NPN of the UE.

1. If the updated permission information of the NPN of the UE includes UE non-public network permission information, then the second network node may perform at least one of:

selecting an SNPN network that supports a connection to the third-party provider for the UE, according to the information of the third-party provider;

the SPNN network connected to the public network;

providing an SNPN network supporting IMS voice;

providing an SNPN network supporting NB-IoT;

providing an SNPN network supporting MTC;

Optionally, in order to increase the accuracy of the updated permission information of the non-public network, the updated permission information of the non-public network further includes: timer information;

where each CAG ID corresponds to a timer, or, All CAG IDs correspond to a timer. That is to say, each CAG ID may correspond to a timer, or all CAG IDs may correspond to the same timer. Then, the network node may determine whether the corresponding CAG ID is valid according to the timer information. If it is valid, the CAG list supported by the UE is updated; otherwise, the update operation may not be performed.

In addition, in order to enable the UE to perform uninterrupted handover and further ensure service continuity, the second network node can also send time information, and communicate with the cell where the UE is currently camping within the time range determined by the time information.

Specifically, the second network node carries a piece of time information (which can ensure that the executed data packet transmission completion time) is sent to the first network node, including reference time information and/or a time period value, so that the UE can have sufficient time for uninterrupted handover. For example, if the service of the UE is URLLC (Ultra-reliable and Low Latency Communication, high-reliability and low-latency communication) and other services that require high reliability, the switching time of the UE can be postponed according to the time information, allowing the UE to continue to receive the service of the cell for a period of time allows the UE to have sufficient time to perform uninterrupted handover.

Figure 6:
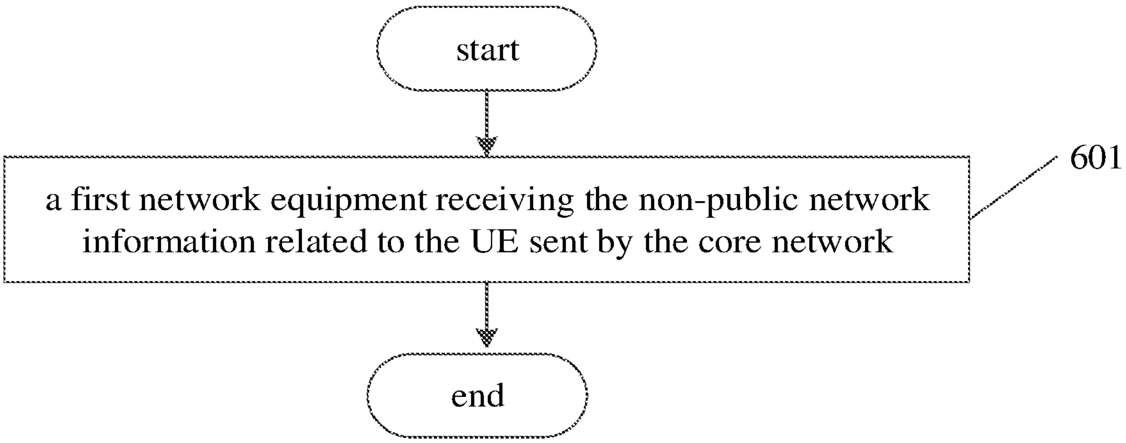
FIG. 6 is the sixth flowchart of the information processing method in an embodiment of the present disclosure.

Referring to FIG. 6, FIG. 6 is a flowchart of an information processing method provided by an embodiment of the present disclosure, which is applied to a first network node, where the first network node is a wireless access network node, as shown in FIG. 6, including the following step:

Step 601, a first network equipment receiving the non-public network information related to the UE sent by the core network, including at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

The receiving by the first network node of the non-public network information related to the UE sent by the second network node may be received through at least one of or messages:

Mobile restriction information; UE initial context establishment request message; handover request message; new non-public network mobile information field in downlink NAS transmission message; or delete NPN non-public network mobile information field; or SNPN in non-public network mobile information field ID or CAG ID updated.

Optionally, the first network node may also receive non-public network information related to the UE sent by the terminal.

Specifically, if the UE obtains update information of non-public network information related to the UE from the second network node or the third network node, the NAS layer of the UE notifies the AS layer of the UE of the update information; and The UE reports update information of non-public network information related to the UE to the first network node through an RRC message, such as assistance information, uplink NAS message, etc.;

On the basis of the above embodiments, the first network node may also perform processing according to the updated permission information of the NPN of the UE.

1. If the updated permission information of the NPN of the UE includes UE non-public network permission information, then the first network node may perform at least one of:

selecting an SNPN network that supports a connection to the third-party provider for the UE, according to the information of the third-party provider;

the SPNN network connected to the public network;

providing an SNPN network supporting IMS voice;

providing an SNPN network supporting NB-IoT;

providing an SNPN network supporting MTC;

authorized CAG list of the UE.

where determining the RAN area according to the authorized CAG list of the UE includes at least one of:

Update CAG ID: In a common RAN Area cell list, the list subset of cells corresponding to update CAG ID;

Update CAG UE to non-CAG UE (non-CAG UE): only open cells are listed in RAN Area;

Updating non-CAG UEs to CAG UEs: only enumerating a list subset of cells corresponding to the CAG ID in the cell list of a common RAN Area.

Optionally, in order to increase the accuracy of the updated permission information of the non-public network, the updated permission information of the non-public network further includes: timer information; where each CAG ID corresponds to a timer, or, All CAG IDs correspond to a timer. That is to say, each CAG ID may correspond to a timer, or all CAG IDs may correspond to the same timer. Then, the first network node may determine whether the corresponding CAG ID is valid according to the timer information. If it is valid, the CAG list supported by the UE is updated; otherwise, the update operation may not be performed.

In addition, in order to enable the UE to perform uninterrupted handover and further ensure service continuity, the first network node may also receive time information sent by the second network node (such as a network node of the core network), and Within the determined time range, communicate with the UE in the cell where the UE is currently camping.

Specifically, the first network node carries a piece of time information (which can ensure that the time when the executed data packet transmission is completed), including reference time information and/or a time period value, so that the UE can have sufficient time for uninterrupted handover. For example, if the service of the UE is URLLC (Ultra-reliable and Low Latency Communication, high-reliability and low-latency communication) and other services that require high reliability, the switching time of the UE can be postponed according to the time information, allowing the UE to continue to receive the service of the cell for a period of time allows the UE to have sufficient time to perform uninterrupted handover.

sends a first message to the UE during a process in which the UE reselects a valid cell to camp on or connect to, where the first message includes any of the following messages: RRC connection release information, redirection message, handover command, and handover start instruction.

Specifically, the first network node will perform the following possible operations according to the received UE information update message:

a. Initiate RRC Release; carry the rejection reason value, carry the target cell information, including the cell id (identification), and the CAG ID of the cell;
b. Send switching command;
c. Initiate redirection;
d. Initiate handover start instruction: UE receives the handover start instruction, immediately triggers the corresponding measurement operation, finds a suitable target cell, and reports it to the network node of the access network. The network node of the access network executes the handover decision and sends the handover command.
2. If the updated permission information of the NPN of the UE includes the updated permission information of the NPN of the UE of the cell, in this step, the first network node performs at least one of:
updating a state of the CAG information of the cell, and send a paging message and a system message update message to the UE; send dedicated signaling to the UE, and the dedicated signaling is used to notify the change of the permission information of the cell.

Specifically, the first network node obtains the permission information change information of the cell from the network management node, and performs any of the following operations:

(1) Update the state of the non-public network information of the cell through the system message, and send paging (paging) and system message update messages to the UE;
(2) The network node of the access network directly sends dedicated signaling to the affected UE in the connected state to notify the UE that the authority information of the cell has changed, and sends an instruction to the illegal UE to notify the illegal UE to leave the cell.

Among them, the non-public network information includes the CAG/SNPN list supported by the cell, whether the CAG/SNPN ID in the list needs to be verified by a third-party service provider, the information of the third-party service provider (such as name, whether it is an SNPN independent The functional entity of the entity, the label of the entity, whether to provide management of authentication of UE access to the SNPN, etc.), the service provided, whether to support simultaneous reception and public network communication, whether to support IMS voice, whether it is NB-IoT/MTC network and other information.

Optionally, if the permission information of the cell changes, the network node sends at least one of messages to the UE: RRC connection release information, handover command, redirection message, and handover start indication:

(1) RRC Release (RRC connection release information); carrying the rejection reason value, carrying the target cell information, including the cell id, and the CAG ID of the cell;
(2) Handover command: Optionally, the handover command includes time information, and is used for the UE to communicate in the cell where the UE is currently camping on within the time range determined by the time information. Specifically, in practical applications, according to the service type of the UE, a time information is carried, including reference time information and/or a time period value; for example, if the service of the UE is URLLC, which requires high reliability, the delay The handover time of the UE allows the UE to continue to receive the service of the cell for a period of time, so that the UE can have sufficient time for uninterrupted handover;
(3) Redirect message;
(4) Handover start instruction: UE receives this instruction, triggers the corresponding measurement operation immediately, finds a suitable target cell, and reports it to the network node of the access network. The network node of the access network executes the handover decision and sends the handover command.

On the basis of the foregoing embodiments, the first network node may also receive at least one of pieces of information sent by the UE:

Random access codes and identification and/or label of non-public networks;
Identification and/or label of MSG3 and non-public networks;
MSGA and non-public network identification and/or labels;
Identification and/or label of a non-public network.

In the embodiment of the present disclosure, the UE can update the non-public network permission information of the UE according to the online updated access information sent by the network node of the core network, thereby avoiding service interruption of the UE and ensuring service continuity.

Figure 7:
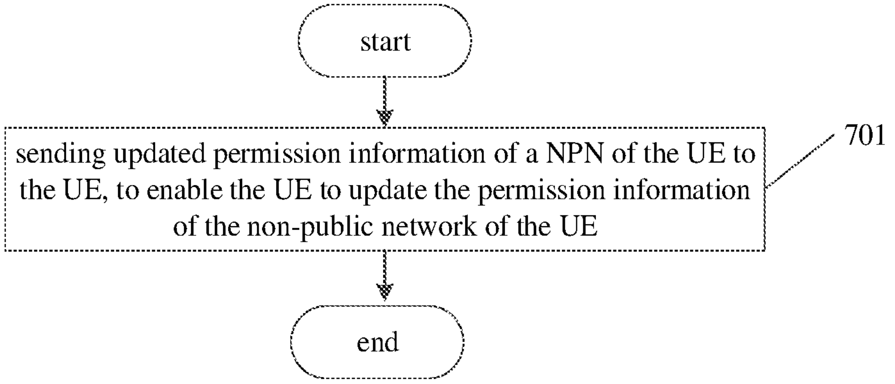
FIG. 7 is the seventh flowchart of the information processing method in an embodiment of the present disclosure.

Referring to FIG. 7, FIG. 7 is a flowchart of an information processing method provided by an embodiment of the present disclosure, which is applied to a first network node, where the first network node is a radio access network node, as shown in FIG. 7, including the following step:

Step 701, sending updated permission information of a non-public network (NPN) of the UE to the UE, to enable the UE to update the permission information of the non-public network of the UE;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

Optionally, the updating the permission information of the NPN of the UE includes at least one of:

supported by the UE, whether the CAG ID or SNPN ID in the CAG list needs to be authenticated by a third-party provider, the authentication content of the UE, the information of the third-party provider, whether supporting a communication with a public network at the same time, and whether it supports IMS voice, whether it is NB-IoT, whether it is MTC.

Specifically, the first network node may send the updated permission information of the NPN of the UE to the UE in any of the following ways:

sending the updated permission information of the NPN of the UE through a PDU session;
sending a RRC signaling, where a radio bearer RB type is added to the RRC signaling, and the added RB type carries the updated permission information of the NPN of the UE.

In addition, the first network node may also send non-public network information related to the UE to a core network or an adjacent base station, including at least one of:

non-public network information and corresponding third network information;
slice information corresponding to the non-public network supported in the updated permission information of the non-public network of the UE;
tracking area information corresponding to the non-public network supported in the updated permission information of the non-public network of the UE;

permission information update of the non-public network of the UE indicated in a reason value of handover failure;

permission information update of the non-public network of the UE indicated in a reason value of handover.

In addition, the first network node may also receive non-public network information related to the UE sent by the core network, including at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

On the basis of the above embodiments, the first network node may also perform processing according to the updated permission information of the NPN of the UE.

1. If the updated permission information of the NPN of the UE includes UE non-public network permission information, then the first network node may perform at least one of:

selecting an SNPN network that supports a connection to the third-party provider for the UE, according to the information of the third-party provider;

the SPNN network connected to the public network;

providing an SNPN network supporting IMS voice;

providing an SNPN network supporting NB-IoT;

providing an SNPN network supporting MTC;

authorized CAG list of the UE.

where the determining the RAN area according to the authorized CAG list of the UE includes at least one of:

Update CAG ID: In a common RAN Area cell list, the list subset of cells corresponding to update CAG ID;

Update CAG UE to non-CAG UE (non-CAG UE): only open cells are listed in RAN Area;

Updating non-CAG UEs to CAG UEs: only enumerating a list subset of cells corresponding to the CAG ID in the cell list of a common RAN Area.

Optionally, in order to increase the accuracy of the updated permission information of the non-public network, the updated permission information of the non-public network further includes: timer information; where each CAG ID corresponds to a timer, or, All CAG IDs correspond to a timer. That is to say, each CAG ID may correspond to a timer, or all CAG IDs may correspond to the same timer. Then, the first network node may determine whether the corresponding CAG ID is valid according to the timer information. If it is valid, the CAG list supported by the UE is updated; otherwise, the update operation may not be performed.

In addition, in order to enable the UE to perform uninterrupted handover and further ensure service continuity, the first network node may also receive time information sent by the second network node (such as a network node of the core network), and Within the determined time range, communicate with the UE in the cell where the UE is currently camping.

Specifically, the first network node carries a piece of time information (which can ensure that the time when the executed data packet transmission is completed), including reference time information and/or a time period value, so that the UE can have sufficient time for uninterrupted handover. For example, if the service of the UE is URLLC (Ultra-reliable and Low Latency Communication, high-reliability and low-latency communication) and other services that require high reliability, the switching time of the UE can be postponed according to the time information, allowing the UE to continue to receive the service of the cell for a period of time allows the UE to have sufficient time to perform uninterrupted handover.

when the UE is in a connected state, the first network node sends a first message to the UE during a process in which the UE reselects a valid cell to camp on or connect to. where the first message includes any of the following messages: RRC connection release information, redirection message, handover command, and handover start instruction.

Specifically, the first network node will perform the following possible operations according to the received UE information update message:

a. Initiate RRC Release; carry the rejection reason value, carry the target cell information, including the cell id (identification), and the CAG ID of the cell;

b. Send switching command;

c. Initiate redirection;

d. Initiate handover start instruction: UE receives the handover start instruction, immediately triggers the corresponding measurement operation, finds a suitable target cell, and reports it to the network node of the access network. The network node of the access network executes the handover decision and sends the handover command.

2. If the updated permission information of the NPN of the UE includes the updated permission information of the NPN of the UE of the cell, in this step, the first network node performs at least one of:

updating a state of the CAG information of the cell, and send a paging message and a system message update message to the UE; send dedicated signaling to the UE, and the dedicated signaling is used to notify the change of the permission information of the cell.

Specifically, the first network node obtains the permission information change information of the cell from the network management node, and performs any of the following operations:

(1) Update the state of the non-public network information of the cell through the system message, and send paging (paging) and system message update messages to the UE;

(2) The first network node directly sends dedicated signaling to the affected UE in the connected state, notifying the UE that the permission information of the cell has changed, and sending an instruction to the illegal UE to notify the illegal UE to leave the cell.

Among them, the non-public network information includes the CAG/SNPN list supported by the cell, whether the CAG/SNPN ID in the list needs to be verified by a third-party service provider, the information of the third-party service provider (such as name, whether it is an SNPN independent Functional entity, the label of the entity, whether to provide management of authentication of UE access to the SNPN, etc.), the services provided, whether to support simultaneous reception and public network communication, whether to support IMS voice, whether it is NB-IoT/MTC network and other information.

Optionally, if the permission information of the cell changes, the first network node sends at least one of messages to the UE: RRC connection release information, handover command, redirection message, handover start indication:

(1) RRC Release (RRC connection release information); carrying the rejection reason value, carrying the target cell information, including the cell id, and the CAG ID of the cell;

(2) Handover command: Optionally, the handover command includes time information, and is used for the UE to communicate in the cell where the UE is currently camping on within the time range determined by the time information. Specifically, in practical applications, according to the service type of the UE, a time information is carried, including reference time information and/or a time period value; for example, if the service of the UE is URLLC, which requires high reliability, the delay The handover time of the UE allows the UE to continue to receive the service of the cell for a period of time, so that the UE can have sufficient time for uninterrupted handover;

(3) Redirect message;

(4) Handover start instruction: UE receives this instruction, triggers the corresponding measurement operation immediately, finds a suitable target cell, and reports it to the network node of the access network. The network node of the access network executes the handover decision and sends the handover command.

On the basis of the foregoing embodiments, the first network node may also receive at least one of pieces of information sent by the UE:

Random access codes and identification and/or label of non-public networks;

Identification and/or label of MSG3 and non-public networks;

MSGA and non-public network identification and/or labels;

Identification and/or label of a non-public network.

In the embodiment of the present disclosure, the UE can update the non-public network permission information of the UE according to the online updated access information sent by the network node of the core network, thereby avoiding service interruption of the UE and ensuring service continuity.

Figure 8:
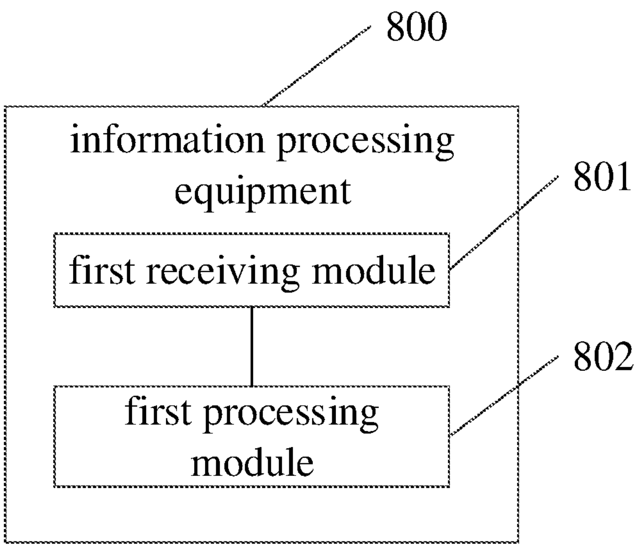
FIG. 8 is the first structural diagrams of an information processing equipment provided by an embodiment of the present disclosure.

The embodiment of the present disclosure also provides an information processing equipment, which is applied to a UE. Referring to FIG. 8, FIG. 8 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 8, the information processing equipment 800 includes: a first receiving module 801 configured to receive first information sent by a first network node, the first information being related to a non-public network; a first processing module 802 configured to Obtaining information of a third network according to the first configuration information and the first information, and initiating an onboarding procedure with the third network;

where in the onboarding procedure, the UE acquires access information from the third network, where the access information includes at least one of:

credential;

subscription information;

information used for authentication and/or authorization;

The third network includes at least one of:

a service provider configured to provide access information of a Standalone NPN (SNPN) used to access an independent network;

a local service provider configured to provide access information for accessing an SNPN;

SO-SNPN for providing access information used to access an SNPN;

onboarding SNPN (O-SNPN) configured to provide access information for accessing an SNPN.

where the first processing module is configured to obtain the information of the third network from a core network according to the first configuration information and the first information.

where the information of the third network further includes at least one of:

O-SNPN information, slice information, data network information, subscription information of at least one local service provider of the UE, label and/or identification of at least one local service provider of the UE, and at least one priority conforming to the first Information about a public land mobile network (PLMN) with a preset requirement, and information of at least one SNPN whose priority meets the second preset requirement.

where the first configuration information is pre-configured for the UE, and includes at least one of:

information of a service provider configured to provide access information;

SNPN information;

O-SNPN information;

SO-SNPN information;

slice information supported by SNPN;

data network information;

subscription information of at least one local service provider;

label and/or identification of at least one local service provider;

information of at least one equivalent local service provider;

service provider control network selector;

a user-controlled network selector;

at least one PLMN whose priority meets a third preset requirement;

at least one SNPN whose priority meets a fourth preset requirement.

where the first information further includes at least one of:

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

where the device further includes:

The second sending module is configured to send a registration request message to the third network, where the registration request message includes at least one of:

information configured to indicate that the registration is not related to a UE subscription;

UE's default credential and corresponding identity;

label/identification, address information and/or identity of the service provider group for which the access information was obtained;

a label/identification, address information and/or identity of a service provider from which the access information is obtained;

a label/identification, address information and/or identity of an O-SNPN from which the access information is obtained;

a label/identification, address information and/or identity of an SO-SNPN from which the access information is obtained;

a first indication configured to provide a radio access network with information for selecting an access and mobility management function (AMF) of a core network and/or indicate that the registration is only limited to an onboarding service.

where before receiving the first information sent by the first network node, the apparatus includes:

The third sending module is configured to perform at least one of:

sending a random access code and an identification and/or a label of the non-public network;

sending an MSG3 and an identification and/or a label of the non-public network;

sending an MSGA and an identification and/or a label of the non-public network;

sending an identification and/or a label of the non-public network.

where the device includes:

The second processing module is configured to update the permission information of the non-public network of the UE according to the access information;

where the permission information of the non-public network includes at least one of:

The cell access group CAG list supported by the UE, the SNPN list supported by the UE, the UE preferred cell access group CAG list and the UE preferred SNPN list, whether the CAG ID or SNPN ID in the CAG list needs to be authenticated by a third-party provider, Authentication content of the UE, information of the third-party provider, whether supporting a communication with a public network at the same time, whether it supports IMS voice, whether it is NB-IoT, whether it is MTC, UE only accessing through non-public networks, and UE can access through public Internet access.

where the device further includes: a third processing module configured to:

when the UE finds that the UE does not have the subscription information of the non-public network according to the received first information, and the non-public network does not support a capability of accessing through access information of a third par initiate the public network Access to a cell under; or when the UE finds that the UE does not have the subscription information of the non-public network according to the received first information, and a cell of the non-public network is a cell of a target version, not initiate an access to a cell of the nons to the cell under the non-public network.

where the first information further includes information indicating that the state of the cell of the non-public network is "prohibited" or the state of the PLMN granularity is "prohibited" or the state of the non-public network identification granularity is "prohibited";

The device further includes:

The first obtaining module is configured to obtain, according to the first information, whether the cell of the non-public network supports UE access by using the access information obtained from the third network;

The fourth processing module is configured to: if the non-public network supports the UE to use the access information obtained from the third network to access, ignore the state of the cell used to indicate the non-public network in the first information dddddddd-ddddthat is "prohibited" or the state of the PLMN granularity is "prohibited" or the state of the non-public network identification granularity is "prohibited";

The fifth processing module is configured to: if the non-public network does not support the UE to use the access information obtained from the third network to access, according to the cell of the non-public network indicated in the first information The state of the PLMN granularity is "prohibited" or the state of the PLMN granularity is "prohibited" or the state of the non-public network identification granularity is "prohibited", and the cell of the non-public network is not accessed.

where the device further includes:

The fourth sending module is configured to send the capability of the UE to the first network node, including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

where the device further includes:

A fifth sending module, configured to send the access information to the first network node.

The device in an embodiment of the present disclosure can execute the above-mentioned method embodiment, and its implementation principle and technical effect are similar, and details will not be repeated here in this embodiment.

Figure 9:
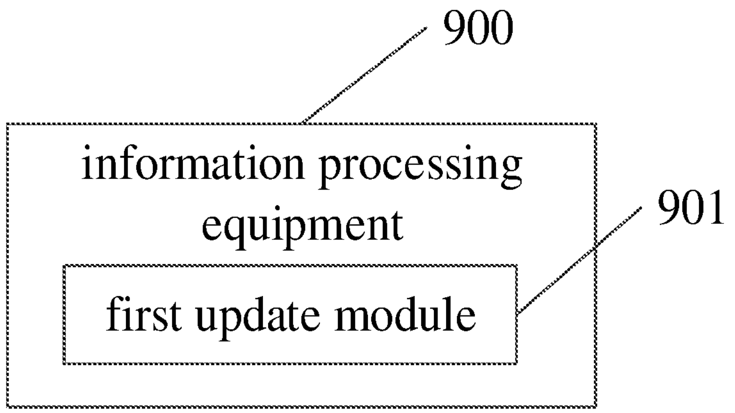
FIG. 9 is the second structural diagram of the information processing equipment in an embodiment of the present disclosure.

The embodiment of the present disclosure also provides an information processing equipment, which is applied to a UE. Referring to FIG. 9, FIG. 9 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 9, the information processing equipment 900 includes: a first update module 901 configured to update the permission information of the non-public network of the UE according to the updated UE's non-public network permission information received from the network node;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

where the updated permission information of UE's non-public network further includes:

an authorized CAG list of the UE, whether the CAG ID or SNPN ID in the CAG list requires third-party provider authentication, UE authentication content, third-party provider information, whether supporting a communication with a public network at the same time, and whether it supports IMS voice, whether it is NB-IoT, whether it is MTC.

where the first update module obtains the permission information of updating the non-public network of the UE in any of the following ways:

the updated permission information of the NPN of the UE sent by the network node using the PDU session;

The RRC signaling sent by the network node is received, the RRC signaling is added with an RB type, and the added RB type carries the updated permission information of the NPN of the UE.

where the device further includes:

The first processing module is configured to reselect a valid cell to camp on or connect to.

where the first processing module of the device is further configured to:

when the UE is in an idle state, query the CAG information of the cell where the UE is currently camping on according to the updated permission information of the NPN of the UE to determine whether the UE is capable of continuing to camp on the cell where the UE is currently camping on; when the UE is not capable of continuing to camp on currently camped cell, triggering a cell selection or reselection;

when the UE is in an inactive state, querying the information of the non-public network of the cell where the UE is currently camping on according to the updated permission information of the non-public network of the UE, and determining whether the UE is capable of continuing to camp on the cell where the UE is currently camping; when UE is not capable of continuing to camp on the cell where the UE is currently camping on, triggering a cell selection or reselection;

when the UE is in a connected state, receiving a first message sent by the network node, performing a measurement according to the first message, and reporting information of a discovered target cell to the network node;

where the first message includes any of the following messages:

RRC connection release information, a redirection message, a handover command, a handover start instruction.

where when the UE is in an inactive state, the first processing module sends a RAN area update signaling when the reselected cell is not in the RAN area.

where the updated permission information of UE's non-public network further includes: timer information; where each CAG ID corresponds to a timer, or, all CAG IDs correspond to a timer;

The device further includes:

The first determining module is configured to determine whether the corresponding CAG ID is valid according to the information of the timer.

where the device further includes:

A first receiving module configured to receive time information sent by the network node;

The second processing module is configured to perform communication in the cell where the current camp is located within the time range determined by the time information.

The device in an embodiment of the present disclosure can execute the above-mentioned method embodiment, and its implementation principle and technical effect are similar, and details will not be repeated here in this embodiment.

Figure 10:
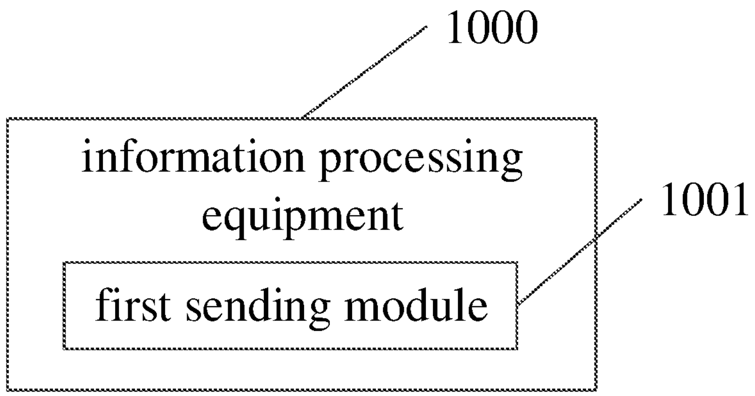
FIG. 10 is the third structural diagram of the information processing equipment in an embodiment of the present disclosure.

An embodiment of the present disclosure also provides an information processing equipment, which is applied to a first network node. Referring to FIG. 10, FIG. 10 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 10, the information processing equipment 1000 includes: a first sending module 1001 configured to send first information to the UE, the first information is related to the non-public network, and is used to make the UE according to the first configuration information determining the information of the third network with the first information, and initiating an onboarding procedure;

where in the onboarding procedure, the UE acquires access information from the third network;

the access information includes at least one of:

credential;

subscription information;

information used for authentication and/or authorization;

The third network includes at least one of:

a service provider for providing access information for accessing an SNPN;

a local service provider configured to provide access information for accessing an SNPN;

SO-SNPN for providing access information used to access an SNPN;

O-SNPN configured to provide access information used to access an SNPN.

where the first information further includes at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

where the device further includes:

the first receiving module configured to receive the access information sent by the UE.

where the device further includes:

the second receiving module configured to receive the capability of the UE sent by the UE, including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

where the first information further includes information indicating that the state of the cell of the non-public network is "prohibited" or the state of the PLMN granularity is "prohibited" or the state of the non-public network identification granularity is "prohibited".

The device in an embodiment of the present disclosure can execute the above-mentioned method embodiment, and its implementation principle and technical effect are similar, and details will not be repeated here in this embodiment.

Figure 11:
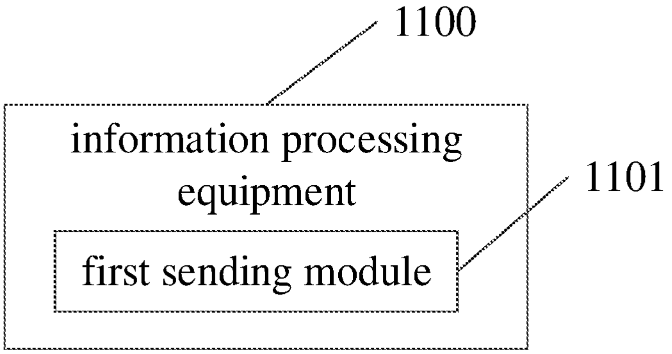
FIG. 11 is the fourth structural diagram of the information processing equipment in an embodiment of the present disclosure.

The embodiment of the present disclosure also provides an information processing equipment, which is applied to a network node. Referring to FIG. 11, FIG. 11 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 11, the information processing equipment 1100 includes: a first sending module 1101 configured to send updated permission information of the NPN of the UE to the UE, for the UE to update the UE's non-public network permission information;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

where the updating the permission information of the NPN of the UE includes at least one of:

supported by the UE, whether the CAG ID or SNPN ID in the CAG list needs to be authenticated by a third-party provider, the authentication content of the UE, the information of the third-party provider, whether supporting a communication with a public network at the same time, and whether it supports IMS voice, whether it is NB-IoT, whether it is MTC.

where the first sending module is configured to send the updated permission information of the NPN of the UE to the UE in any of the following ways:

sending the updated permission information of the NPN of the UE through a PDU session;

sending a RRC signaling, where a radio bearer RB type is added to the RRC signaling, and the added RB type carries the updated permission information of the NPN of the UE.

where the device further includes:

The second sending module is configured to send non-public network information related to the UE to a core network or an adjacent base station, including at least one of:

non-public network information and corresponding third network information;

slice information corresponding to the non-public network supported in the updated permission information of the non-public network of the UE;

tracking area information corresponding to the non-public network supported in the updated permission information of the non-public network of the UE;

permission information update of the non-public network of the UE indicated in a reason value of handover failure;

permission information update of the non-public network of the UE indicated in a reason value of handover.

where the device further includes:

The first receiving module is configured to receive non-public network information related to the UE sent by the core network, including at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

where the device further includes:

The first processing module is configured to process according to the updated permission information of the NPN of the UE, including at least one of:

selecting an SNPN network that supports a connection to the third-party provider for the UE, according to the information of the third-party provider;

the SPNN network connected to the public network;

providing an SNPN network supporting IMS voice;

providing an SNPN network supporting NB-IoT;

providing an SNPN network supporting MTC;

according to the authorized CAG list of the UE.

where the first processing module is configured to perform at least one of:

updating the RAN area according to the updated CAG ID;

when the CAG UE is updated to a non-CAG UE, selecting a public cell as the RAN area of the UE;

when a non-CAG UE is updated to a CAG UE, taking the CAG cell as the RAN area of the UE.

where the permission information for the non-public network further includes: timer information; where each CAG ID corresponds to a timer, or, all CAG IDs correspond to a timer;

The device further includes: a first determination module configured to determine whether the corresponding CAG ID is valid according to the information of the timer.

where the device further includes:

a second receiving module configured to receive time information sent by a second network node, and send the time information to the UE;

the second processing module configured to communicate with the cell where the UE is currently camping within the time range determined by the time information.

where the device further includes: a second sending module, configured to send the first message to the UE when the UE reselects a valid cell to camp on or connect to if the UE is in a connected state;

where the first message includes any of the following messages:

RRC connection release information, a redirection message, a handover command, a handover start instruction.

where the permission information of the non-public network of the UE used for updating includes the permission information of the non-public network of the UE of the updated cell;

The device further includes:

the third processing module configured to process according to the updated permission information of the NPN of the UE, including at least one of:

updating a state of the CAG information of the cell, and send a paging message and a system message update message to the UE;

sending a dedicated signaling to the UE, where the dedicated signaling is configured to notify a change of the permission information of the cell.

where the device further includes:

The third sending module is configured to send at least one of messages to the UE:

RRC connection release information, handover command, redirection message, handover start instruction.

where the handover command includes time information, and is used for the UE to communicate in the cell where the UE is currently camping on within the time range determined by the time information.

where the device further includes:

The third receiving module is configured to receive at least one of sent by the UE:

Random access codes and identification and/or label of non-public networks;

Identification and/or label of MSG3 and non-public networks;

MSGA and non-public network identification and/or labels;

Identification and/or label of a non-public network.

The device in an embodiment of the present disclosure can execute the above-mentioned method embodiment, and its implementation principle and technical effect are similar, and details will not be repeated here in this embodiment.

Figure 12:
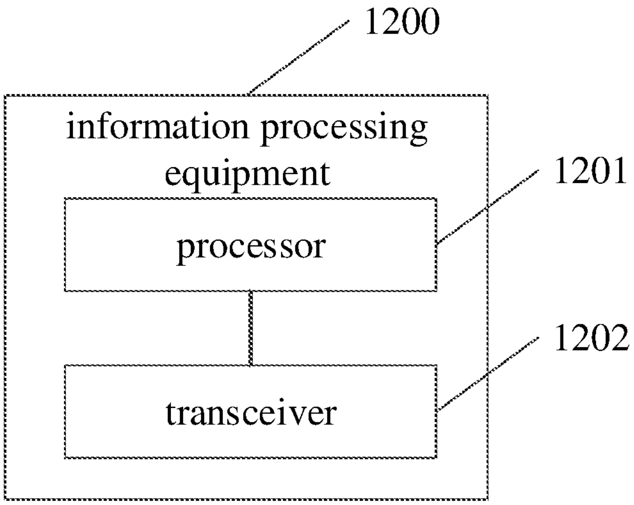
FIG. 12 is the fifth structural diagram of the information processing equipment in an embodiment of the present disclosure.

The embodiment of the present disclosure also provides an information processing equipment, which is applied to a UE. Referring to FIG. 12, FIG. 12 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 12, the information processing equipment 1200 includes: a processor 1201 and a transceiver 1202;

The transceiver is configured to receive first information sent by a first network node, where the first information is related to a non-public network;

The processor is configured to obtain information of a third network according to the first configuration information and the first information, and initiate an onboarding procedure with the third network;

where in the onboarding procedure, the UE acquires access information from the third network, where the access information includes at least one of:

credential;

subscription information;

information used for authentication and/or authorization;

The third network includes at least one of:

a service provider configured to provide access information of a Standalone NPN (SNPN) used to access an independent network;

a local service provider configured to provide access information for accessing an SNPN;

SO-SNPN for providing access information used to access an SNPN;

onboarding SNPN (O-SNPN) configured to provide access information for accessing an SNPN.

where the processor is further configured to obtain the information of the third network from a core network according to the first configuration information and the first information.

where the information of the third network further includes at least one of:

O-SNPN information, slice information, data network information, subscription information of at least one local service provider of the UE, label and/or identification of at least one local service provider of the UE, and at least one priority conforming to the first Information about a public land mobile network (PLMN) with a preset requirement, and information of at least one SNPN whose priority meets the second preset requirement.

where the first configuration information is pre-configured for the UE, and includes at least one of:

information of a service provider configured to provide access information;

SNPN information;

O-SNPN information;

SO-SNPN information;

slice information supported by SNPN;

data network information;

subscription information of at least one local service provider;

label and/or identification of at least one local service provider;

information of at least one equivalent local service provider;

service provider control network selector;
a user-controlled network selector;
at least one PLMN whose priority meets a third preset requirement;
at least one SNPN whose priority meets a fourth preset requirement.
where the first information further includes at least one of:
an indication that the non-public network supports the UE to access to the non-public network by using the access information obtained from the third network;
a third network supported by at least one non-public network;
a label/identification of at least one service provider group supported by the non-public network;
an indication of whether the non-public network supports the onboarding procedure;
an identification of the third network;
a list of group identification IDs;
an indication of whether the non-public network corresponding to a name identifying a non-public network used for manual selection supports the UE to access to the non-public network by using the access information obtained from the third network.
where the transceiver is further configured to send a registration request message to the third network, where the registration request message includes at least one of:
information configured to indicate that the registration is not related to a UE subscription;
UE's default credential and corresponding identity;
label/identification, address information and/or identity of the service provider group for which the access information was obtained;
a label/identification, address information and/or identity of a service provider from which the access information is obtained;
a label/identification, address information and/or identity of an O-SNPN from which the access information is obtained;
a label/identification, address information and/or identity of an SO-SNPN from which the access information is obtained;
a first indication configured to provide a radio access network with information for selecting an access and mobility management function (AMF) of a core network and/or indicate that the registration is only limited to an onboarding service.
where the transceiver is further configured to perform at least one of:
Send random access codes and identification and/or labels of non-public networks;
sending an MSG3 and an identification and/or a label of the non-public network;
sending an MSGA and an identification and/or a label of the non-public network;
sending an identification and/or a label of the non-public network.
where the processor is further configured to update the permission information of the non-public network of the UE according to the access information;
where the permission information of the non-public network includes at least one of:

The cell access group CAG list supported by the UE, the SNPN list supported by the UE, the UE preferred cell access group CAG list and the UE preferred SNPN list, whether the CAG ID or SNPN ID in the CAG list needs to be authenticated by a third-party provider, Authentication content of the UE, information of the third-party provider, whether supporting a communication with a public network at the same time, whether it supports IMS voice, whether it is NB-IoT, whether it is MTC, UE only accessing through non-public networks, and UE can access through public Internet access.

where the processor is further configured to:
when the UE finds that the UE does not have the subscription information of the non-public network according to the received first information, and the non-public network does not support a capability of accessing through access information of a third par initiate the public network Access to a cell under; or
when the UE finds that the UE does not have the subscription information of the non-public network according to the received first information, and a cell of the non-public network is a cell of a target version, not initiate an access to a cell of the nons to the cell under the non-public network.
where the first information further includes information indicating that the state of the cell of the non-public network is "prohibited" or the state of the PLMN granularity is "prohibited" or the state of the non-public network identification granularity is "prohibited";
where the processor is further configured to:
acquiring, according to the first information, information whether a cell of the non-public network supports being accessed by the UE using the access information obtained from the third network;
If the non-public network supports the UE to use the access information obtained from the third network to access, ignore the first information indicating that the state of the cell of the non-public network is "prohibited" or PLMN granularity Information that the state is "prohibited" or the state of non-public network identification granularity is "prohibited";
If the non-public network does not support the UE to use the access information obtained from the third network to access, according to the state of the cell of the non-public network indicated in the first information is "prohibited" or PLMN The state of the granularity is "prohibited" or the non-public network identifies the information that the state of the granularity is "prohibited", and the cell of the non-public network is not accessed.
where the transceiver is further configured to send the capability of the UE to the first network node, including at least one of:
whether the UE supports an updating of permission information of the non-public network;
the UE supporting an updating of permission information of the non-public network;
the UE not supporting an updating of permission information of the non-public network;
whether the UE supporting using the access information obtained from the third network to access the non-public network;
the UE supporting using the access information obtained from the third network to access the non-public network;
the UE not supporting using the access information obtained from the third network to access the non-public network;
a third network supported by the UE;
a label/identification of a service provider group supported by the UE;

an identification of the non-public network which the UE supports to access by using the access information obtained from the third network.

where the transceiver is further configured to send the access information to the first network node.

The device in an embodiment of the present disclosure can execute the above-mentioned method embodiment, and its implementation principle and technical effect are similar, and details will not be repeated here in this embodiment.

Figure 13:
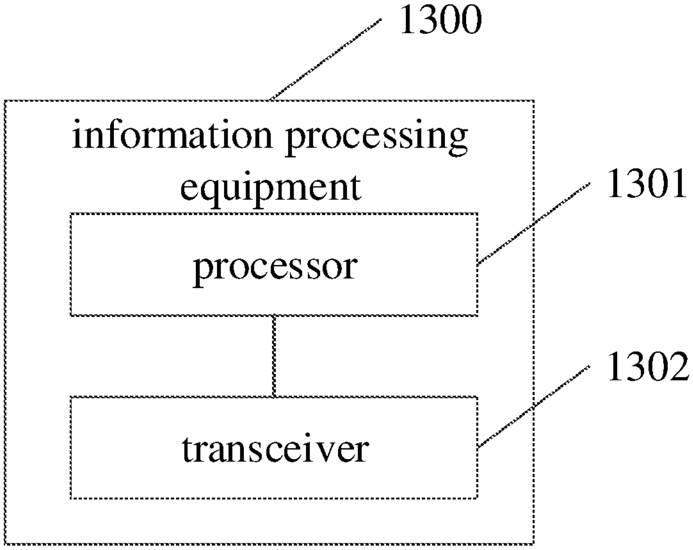
FIG. 13 is the sixth structural diagram of the information processing equipment in an embodiment of the present disclosure.

The embodiment of the present disclosure also provides an information processing equipment, which is applied to a UE. Referring to FIG. 13, FIG. 13 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 13, the information processing equipment 1300 includes: a processor 1301 and a transceiver 1302;

the processor is configured to update permission information of a non-public network (NPN) of the UE, according to updated permission information of the NPN of the UE received from a network node;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

where the updated permission information of UE's non-public network further includes:

an authorized CAG list of the UE, whether the CAG ID or SNPN ID in the CAG list requires third-party provider authentication, UE authentication content, third-party provider information, whether supporting a communication with a public network at the same time, and whether it supports IMS voice, whether it is NB-IoT, whether it is MTC.

where the processor is configured to obtain the permission information of updating the non-public network of the UE in any of the following ways:

receiving the updated permission information of the NPN of the UE sent by the network node using the PDU session;

The RRC signaling sent by the network node is received, the RRC signaling is added with an RB type, and the added RB type carries the updated permission information of the NPN of the UE.

where the processor is configured to reselect a valid cell to camp on or connect to.

where the processor is configured to:

when the UE is in an idle state, query the CAG information of the cell where the UE is currently camping on according to the updated permission information of the NPN of the UE to determine whether the UE is capable of continuing to camp on the cell where the UE is currently camping on; when the UE is not capable of continuing to camp on currently camped cell, triggering a cell selection or reselection;

when the UE is in an inactive state, querying the information of the non-public network of the cell where the UE is currently camping on according to the updated permission information of the non-public network of the UE, and determining whether the UE is capable of continuing to camp on the cell where the UE is currently camping; when UE is not capable of continuing to camp on the cell where the UE is currently camping on, triggering a cell selection or reselection;

when the UE is in a connected state, receiving a first message sent by the network node, performing a measurement according to the first message, and reporting information of a discovered target cell to the network node;

where the first message includes any of the following messages:

RRC connection release information, a redirection message, a handover command, a handover start instruction.

where the processor is configured to send a RAN area update signaling when the reselected cell is not in the RAN area when the UE is in an inactive state.

where the updated permission information of UE's non-public network further includes: timer information; where each CAG ID corresponds to a timer, or, all CAG IDs correspond to a timer;

where the processor is configured to determine whether the corresponding CAG ID is valid according to the information of the timer.

where the transceiver is configured to receive the time information sent by the network node; the processor is configured to communicate in the cell where it currently resides within the time range determined by the time information.

The device in an embodiment of the present disclosure can execute the above-mentioned method embodiment, and its implementation principle and technical effect are similar, and details will not be repeated here in this embodiment.

Figure 14:
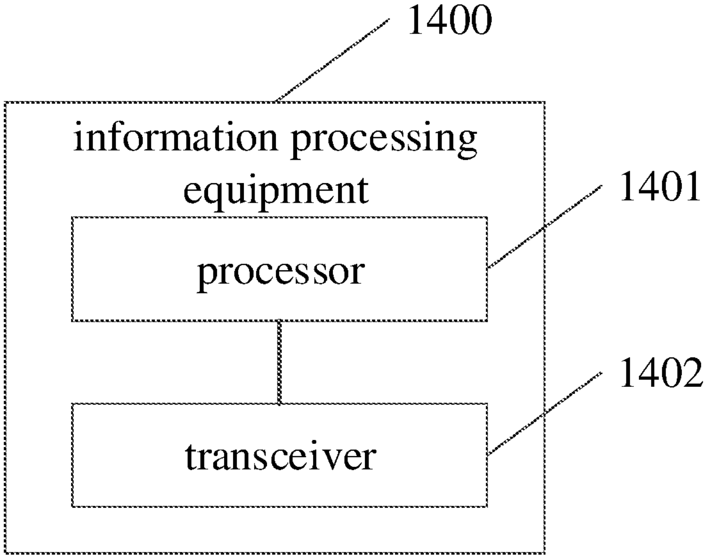
FIG. 14 is the seventh structural diagram of the information processing equipment in an embodiment of the present disclosure.

An embodiment of the present disclosure also provides an information processing equipment, which is applied to a first network node. Referring to FIG. 14, FIG. 14 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 14, the information processing equipment 1400 includes: a processor 1401 and a transceiver 1402;

The transceiver is configured to send first information to the UE, where the first information is related to a non-public network, and is used to enable the UE to determine information of a third network according to the first configuration information and the first information, and initiate the onboarding procedure;

where in the onboarding procedure, the UE acquires access information from the third network;

the access information includes at least one of:

credential;

subscription information;

information used for authentication and/or authorization;

the third network includes at least one of:

a service provider for providing access information for accessing an SNPN;

a local service provider configured to provide access information for accessing an SNPN;

SO-SNPN for providing access information used to access an SNPN;

O-SNPN configured to provide access information used to access an SNPN.

where the first information further includes at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

where the transceiver is further configured to receive the access information sent by the UE.

where the transceiver is further configured to receive the capability of the UE sent by the UE, including at least one of:

whether the UE supports an updating of permission information of the non-public network;

the UE supporting an updating of permission information of the non-public network;

the UE not supporting an updating of permission information of the non-public network;

whether the UE supporting using the access information obtained from the third network to access the non-public network;

the UE supporting using the access information obtained from the third network to access the non-public network;

the UE not supporting using the access information obtained from the third network to access the non-public network;

a third network supported by the UE;

a label/identification of a service provider group supported by the UE;

an identification of the non-public network which the UE supports to access by using the access information obtained from the third network.

where the first information further includes information indicating that the state of the cell of the non-public network is "prohibited" or the state of the PLMN granularity is "prohibited" or the state of the non-public network identification granularity is "prohibited".

The device in an embodiment of the present disclosure can execute the above-mentioned method embodiment, and its implementation principle and technical effect are similar, and details will not be repeated here in this embodiment.

Figure 15:
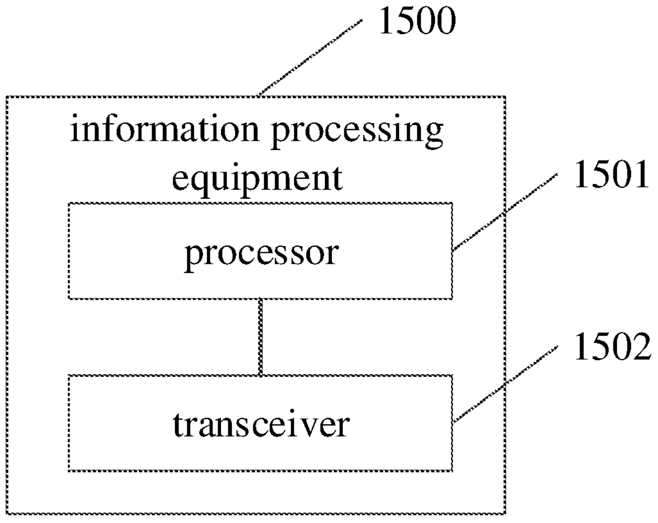
FIG. 15 is the eighth structural diagram of the information processing equipment in an embodiment of the present disclosure.

The embodiment of the present disclosure also provides an information processing equipment, which is applied to a network node. Referring to FIG. 15, FIG. 15 is a structural diagram of an information processing equipment provided by an embodiment of the present disclosure. Since the problem-solving principle of the information processing equipment is similar to that of the information processing method in the embodiment of the present disclosure, the implementation of the information processing equipment can refer to the implementation of the method, and repeated descriptions will not be repeated.

As shown in FIG. 15, the information processing equipment 1500 includes: a processor 1501 and a transceiver 1502;

The transceiver is configured to send the updated permission information of the NPN of the UE to the UE, for the UE to update the permission information of the non-public network of the UE;

where the permission information of the non-public network of the UE includes at least one of:

a CAG list supported by the UE, an SNPN list supported by the UE, a CAG list and an SNPN list preferred by the UE, the UE only accessing through non-public network, and the UE accessing through public network.

where the updating the permission information of the NPN of the UE includes at least one of:

supported by the UE, whether the CAG ID or SNPN ID in the CAG list needs to be authenticated by a third-party provider, the authentication content of the UE, the information of the third-party provider, whether supporting a communication with a public network at the same time, and whether it supports IMS voice, whether it is NB-IoT, whether it is MTC.

where the transceiver is configured to send the updated permission information of the NPN of the UE to the UE in any of the following ways:

sending the updated permission information of the NPN of the UE through a PDU session;

sending a RRC signaling, where a radio bearer RB type is added to the RRC signaling, and the added RB type carries the updated permission information of the NPN of the UE.

where the transceiver is configured to send non-public network information related to the UE to a core network or an adjacent base station, including at least one of:

non-public network information and corresponding third network information;

slice information corresponding to the non-public network supported in the updated permission information of the non-public network of the UE;

tracking area information corresponding to the non-public network supported in the updated permission information of the non-public network of the UE;

permission information update of the non-public network of the UE indicated in a reason value of handover failure;

permission information update of the non-public network of the UE indicated in a reason value of handover.

where the transceiver is configured to receive non-public network information related to the UE sent by the core network, including at least one of:

non-public network information and corresponding third network information;

non-public network information and access information provided by corresponding third network information;

the updated permission information of the non-public network of the UE;

a list of deleted SPNNs and/or CAGs in non-public network mobility information;

a list of newly added SNPN and/or CAGs in non-public network mobile information;

a list of deleted non-public network mobile information;

a list of added non-public network mobile information.

where the processor is configured to process according to the updated permission information of the NPN of the UE, including at least one of:

select an SNPN network that supports the connection of the third-party provider for the UE;

the SPNN network connected to the public network;

providing an SNPN network supporting IMS voice;

providing an SNPN network supporting NB-IoT;

providing an SNPN network supporting MTC;

authorized CAG list of the UE.

where the transceiver is configured to perform at least one of:

updating the RAN area according to the updated CAG ID;

when the CAG UE is updated to a non-CAG UE, selecting a public cell as the RAN area of the UE;

when a non-CAG UE is updated to a CAG UE, taking the CAG cell as the RAN area of the UE.

where the permission information for the non-public network further includes: timer information; where each CAG ID corresponds to a timer, or, all CAG IDs correspond to a timer;

where the processor is configured to determine whether the corresponding CAG ID is valid according to the information of the timer.

where the transceiver is configured to receive time information sent by the second network node, and send the time information to the UE;

The processor is configured to communicate with the cell where the UE is currently camping within the time range determined by the time information.

where the processor is configured to, if the UE is in the connected state, send the first message to the UE during the process of the UE reselecting a valid cell to camp on or connect to;

where the first message includes any of the following messages:

RRC connection release information, a redirection message, a handover command, a handover start instruction.

where the permission information of the non-public network of the UE used for updating includes the permission information of the non-public network of the UE of the updated cell;

where the processor is configured to process according to the updated permission information of the NPN of the UE, including at least one of:

updating a state of the CAG information of the cell, and send a paging message and a system message update message to the UE;

sending a dedicated signaling to the UE, where the dedicated signaling is configured to notify a change of the permission information of the cell.

where the transceiver is configured to send at least one of messages to the UE:

RRC connection release information, handover command, redirection message, handover start instruction.

where the handover command includes time information, and is used for the UE to communicate in the cell where the UE is currently camping on within the time range determined by the time information.

where the transceiver is configured to receive at least one of sent by the UE:

Random access codes and identification and/or label of non-public networks;

Identification and/or label of MSG3 and non-public networks;

MSGA and non-public network identification and/or labels;

Identification and/or label of a non-public network.

The device in an embodiment of the present disclosure can execute the above-mentioned method embodiment, and its implementation principle and technical effect are similar, and details will not be repeated here in this embodiment.

An embodiment of the present disclosure provides a communication device, including: a transceiver, a memory, a processor, and a program stored on the memory and executable by the processor; the processor is configured to read the program implements the steps in the information processing method described in any one of the preceding aspects.

The embodiment of the present disclosure also provides a readable storage medium, on which a program is stored, and when the program is performed by a processor, each process of the above-mentioned information processing method embodiment can be achieved, and the same technical effect can be achieved. Repeat, no more details here. where the readable storage medium can be any available medium or data storage device that can be accessed by the processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state hard drive (SSD)), etc.

It should be noted that, in this document, the term "including", "including" or any other variation thereof is intended to cover a non-exclusive inclusion such that a process, method, article or apparatus including a set of elements includes not only those elements, It further includes other elements not expressly listed, or elements inherent in the process, method, article, or device. Without further limitations, an element defined by the phrase "including a . . . " does not preclude the presence of additional identical elements in the process, method, article, or apparatus including that element.

Through the description of the above embodiments, those skilled in the art can clearly understand that the methods of the above embodiments can be implemented by means of software plus a necessary general-purpose hardware platform, and of course also by hardware, but in many cases the former is better implementation. According to such an understanding, the technical solution of the present disclosure or the part that contributes to the prior art can be embodied in the form of software products, and the computer software products are stored in a storage medium (such as ROM/RAM, magnetic disk, optical disk, etc.)) includes several instructions to make a terminal (which may be a mobile phone, a computer, a server, an air conditioner, or a network node, etc.) execute the methods described in various embodiments of the present disclosure.

Embodiments of the present disclosure have been described above in conjunction with the accompanying drawings, but the present disclosure is not limited to the above-mentioned specific implementations, and the above-mentioned specific implementations are only illustrative, rather than restrictive, and those of ordinary skill in the art will Under the enlightenment of the present disclosure, without departing from the gist of the present disclosure and the protection scope of the claims, many forms can also be made, all of which belong to the protection of the present disclosure.

What is claimed is:

1. An information processing method, performed by a user equipment (UE), comprising:

receiving first information sent by a first network node, wherein the first information is related to a non-public network (NPN);

obtaining information of a third network according to first configuration information and the first information, and initiating an onboarding procedure with the third network;

wherein in the onboarding procedure, the UE acquires access information from the third network, wherein the access information comprises credential, or credential, subscription information and information used for authentication and/or authorization;

the third network comprises at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN;

wherein the first configuration information is pre-configured for the UE, and comprises at least one of:

information of a service provider configured to provide access information;

SNPN information;

O-SNPN information;

SO-SNPN information;

slice information supported by SNPN;

data network information;

subscription information of at least one local service provider;

a label and/or an identification of at least one local service provider;

information of at least one equivalent local service provider;

a service provider control network selector;

a user-controlled network selector;

at least one PLMN whose priority meets a third preset requirement;

at least one SNPN whose priority meets a fourth preset requirement;

wherein the first information further comprises information configured to indicate that a state of a cell of the non-public network is "prohibited" or a state of a PLMN granularity is "prohibited" or a state of a non-public network identification granularity is "prohibited";

the method further comprises:

acquiring, according to the first information, information whether a cell of the non-public network supports being accessed by the UE using the access information obtained from the third network;

when the non-public network supports being accessed by the UE using the access information obtained from the third network, ignoring the information in the first information indicating that the state of the cell of the non-public network is "prohibited" or the state of the PLMN granularity is "prohibited" or the state of non-public network identification granularity is "prohibited";

when the non-public network does not support being accessed by the UE using the access information obtained from the third network, not accessing to the cell of the non-public network, according to the information in the first information indicating that the state of the cell of the non-public network is "prohibited" or the state of the PLMN granularity is "prohibited" or the state of the non-public network identification granularity is "prohibited".

2. The method according to claim 1, wherein the obtaining the information of the third network according to the first configuration information and the first information comprises:

obtaining the information of the third network from a core network according to the first configuration information and the first information.

3. The method according to claim 1, wherein the information of the third network further comprises at least one of:

O-SNPN information, slice information, data network information, subscription information of at least one local service provider of the UE, a label and/or an identification of at least one local service provider of the UE, information of at least one public land mobile network (PLMN) whose priority meets a first preset requirement, and information of at least one SNPN whose priority meets a second preset requirement.

4. The method according to claim 1, wherein the first information further comprises at least one of:

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

5. The method according to claim 1, wherein the method further comprises:

sending a registration request message to the third network, wherein the registration request message comprises at least one of:

information configured to indicate that the registration is not related to a UE subscription;

a UE's default credential and corresponding identity;

a label/identification, address information and/or identity of a service provider group from which the access information is obtained;

a label/identification, address information and/or identity of a service provider from which the access information is obtained;

a label/identification, address information and/or identity of an O-SNPN from which the access information is obtained;

a label/identification, address information and/or identity of an SO-SNPN from which the access information is obtained;

a first indication configured to provide a radio access network with information for selecting an access and mobility management function (AMF) of a core network and/or indicate that the registration is only limited to an onboarding service.

6. The method according to claim 1, wherein prior to the receiving the first information sent by the first network node, the method further comprises at least one of:

sending a random access code and an identification and/or a label of the non-public network;

sending an MSG3 and an identification and/or a label of the non-public network;

sending an MSGA and an identification and/or a label of the non-public network;

sending an identification and/or a label of the non-public network.

7. The method according to claim 1, wherein the method further comprises:

updating permission information of the non-public network of the UE according to the access information;

wherein the permission information of the non-public network comprises at least one of:

a CAG list supported by the UE, an SNPN list supported by the UE, a CAG list and an SNPN list preferred by the UE, whether a CAG ID or an SNPN ID in a CAG list needs a third-party provider's authentication, UE authentication content, third-party provider information, whether supporting a communication with a public network at the same time, whether supporting an IP multimedia subsystem (IMS) voice, whether being a narrowband Internet of Things (NB-IOT), whether being a machine type communication (MTC), UE only accessing through non-public network, UE accessing through public network.

8. The method according to claim 1, wherein the method further comprises:

when the UE finds that the UE does not have the subscription information of the non-public network according to the received first information, and the non-public network does not support a capability of accessing through access information of a third party, not initiating an access to a cell of the public network;

or when the UE finds that the UE does not have the subscription information of the non-public network according to the received first information, and a cell of the non-public network is a cell of a target version, not initiating an access to a cell of the non-public network.

9. An information processing equipment, comprising: a transceiver, a memory, a processor, and a program stored in the memory and executable by the processor;

wherein the processor is configured to read the program in the memory to perform the information processing method according to claim 1.

10. An information processing method, performed by a first network node, comprising:

sending first information to a user equipment (UE), wherein the first information is related to a non-public network (NPN), and configured to enable the UE to determine information of a third network according to first configuration information and the first information and initiate an onboarding procedure;

wherein in the onboarding procedure, the UE acquires access information from a third network;

the access information comprises credential, or comprises credential, subscription information and information used for authentication and/or authorization;

the third network comprises at least one of:

a service provider configured to provide access information used to access a Standalone NPN (SNPN);

a local service provider configured to provide access information for accessing an SNPN;

a Subscriber Owner SNPN (SO-SNPN) configured to provide access information for accessing an SNPN;

an onboarding SNPN (O-SNPN) configured to provide access information for accessing an SNPN;

wherein the first configuration information is pre-configured for the UE, and comprises at least one of:

information of a service provider configured to provide access information;

SNPN information;

O-SNPN information;

SO-SNPN information;

slice information supported by SNPN;

data network information;

subscription information of at least one local service provider;

a label and/or an identification of at least one local service provider;

information of at least one equivalent local service provider;

a service provider control network selector;

a user-controlled network selector;

at least one PLMN whose priority meets a third preset requirement;

at least one SNPN whose priority meets a fourth preset requirement;

wherein the first information further comprises information configured to indicate that a state of a cell of the non-public network is "prohibited" or a state of a PLMN granularity is "prohibited" or a state of a non-public network identification granularity is "prohibited";

the method further comprises:

acquiring, according to the first information, information whether a cell of the non-public network supports being accessed by the UE using the access information obtained from the third network;

when the non-public network supports being accessed by the UE using the access information obtained from the third network, ignoring the information in the first information indicating that the state of the cell of the non-public network is "prohibited" or the state of the PLMN granularity is "prohibited" or the state of non-public network identification granularity is "prohibited";

when the non-public network does not support being accessed by the UE using the access information obtained from the third network, not accessing to the cell of the non-public network, according to the information in the first information indicating that the state of the cell of the non-public network is "prohibited" or the state of the PLMN granularity is "prohibited" or the state of the non-public network identification granularity is "prohibited".

11. The method according to claim 10, wherein the first information further comprises at least one of:

an indication of access to one or more non-public networks supported by the network using a service provider authentication;

an indication that the non-public network supports the UE to access to the non-public network by using the access information obtained from the third network;

a third network supported by at least one non-public network;

a label/identification of at least one service provider group supported by the non-public network;

an indication of whether the non-public network supports the onboarding procedure;

an identification of the third network;

a list of group identification IDs;

an indication of whether the non-public network corresponding to a name identifying a non-public network used for manual selection supports the UE to access to the non-public network by using the access information obtained from the third network.

12. The method according to claim 10, wherein the method further comprises:

receiving the access information sent by the UE.

13. An information processing equipment, comprising: a transceiver, a memory, a processor, and a program stored in the memory and executable by the processor;

wherein the processor is configured to read the program in the memory to perform the information processing method according to claim 10.

* * * * *